US011638278B2

(12) United States Patent
Ma et al.

(10) Patent No.: US 11,638,278 B2
(45) Date of Patent: Apr. 25, 2023

(54) CONFIGURABLE CYCLIC PREFIX LENGTHS FOR SINGLE CARRIER WAVEFORMS

(71) Applicant: QUALCOMM Incorporated, San Diego, CA (US)

(72) Inventors: Jun Ma, San Diego, CA (US); Xiaoxia Zhang, San Diego, CA (US); Iyab Issam Sakhnini, San Diego, CA (US); Anantha Krishna Karthik Nagarajan, San Diego, CA (US); Morteza Soltani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/161,643

(22) Filed: Jan. 28, 2021

(65) Prior Publication Data

US 2022/0240277 A1    Jul. 28, 2022

(51) Int. Cl.
*H04W 72/08* (2009.01)
*H04W 72/1263* (2023.01)
(Continued)

(52) U.S. Cl.
CPC ......... *H04W 72/1263* (2013.01); *H04J 11/00* (2013.01); *H04L 5/0023* (2013.01);
(Continued)

(58) Field of Classification Search
CPC ............... H04W 72/085; H04W 24/10; H04W 72/0446; H04W 72/042; H04W 76/27;
(Continued)

(56) References Cited

U.S. PATENT DOCUMENTS 9,763,258 B2 * 9/2017 Frenger ............... H04L 27/2666
10,154,486 B2 * 12/2018 Miao ................... H04W 72/085
(Continued)

FOREIGN PATENT DOCUMENTS

WO    WO-2020160554 A1    8/2020

OTHER PUBLICATIONS

International Search Report and Written Opinion—PCT/US2022/070362—ISA/EPO—dated May 6, 2022.
(Continued)

*Primary Examiner* — Jung Liu
(74) *Attorney, Agent, or Firm* — Holland & Hart LLP/Qualcomm Incorporated

(57) ABSTRACT

Methods, systems, and devices for wireless communications are described. Some systems may support wireless communications in high frequency millimeter wave (mmW) bands, such as frequency range 4 (FR4) or other frequency ranges. To support such communications, a base station may dynamically configure a cyclic prefix (CP) length for single carrier waveform communications. The base station may determine the CP length to handle a beam switching delay, a delay spread of a physical propagation channel, or both. In some examples, a user equipment (UE) may provide feedback to the base station, and the base station may configure the UE with a CP length based on the feedback. The base station may transmit a configuration message to a UE indicating the configured CP length. A single carrier waveform with the configured CP length may maintain a symbol-level alignment with other supported waveforms, such as orthogonal frequency division multiplexing (OFDM) waveforms.

30 Claims, 17 Drawing Sheets

(51) Int. Cl.
*H04J 11/00* (2006.01)
*H04L 5/00* (2006.01)
*H04W 72/04* (2023.01)

(52) U.S. Cl.
CPC ......... *H04L 5/0053* (2013.01); *H04W 72/042* (2013.01); *H04J 2011/0096* (2013.01)

(58) Field of Classification Search
CPC ............... H04L 1/0006; H04L 27/2607; H04L 27/2666; H04L 27/261; H04L 5/0048; H04L 27/26025; H04L 5/0094; H04L 27/2605; H04L 5/0023; H04L 5/0005; H04L 27/2646; H04L 5/0007; H04L 5/0053; H04B 7/0617; H04B 7/0408
See application file for complete search history.

(56) References Cited

U.S. PATENT DOCUMENTS

| | | | | |
|---|---|---|---|---|
| 10,868,702 B2* | 12/2020 | Park | ................... | H04L 27/2607 |
| 11,050,599 B2* | 6/2021 | Zhang | ................. | H04W 72/042 |
| 2013/0022090 A1* | 1/2013 | Weng | .................. | H04L 27/2607 |
| | | | | 375/260 |
| 2015/0358983 A1* | 12/2015 | Frenger | ................. | H04L 1/0006 |
| | | | | 370/329 |
| 2017/0127411 A1* | 5/2017 | Miao | ................... | H04W 72/085 |
| 2018/0062811 A1 | 3/2018 | Akkarakaran et al. | | |
| 2018/0097679 A1* | 4/2018 | Zhang | ................. | H04W 72/121 |
| 2020/0351134 A1* | 11/2020 | Park | .................... | H04L 27/2607 |
| 2020/0374067 A1* | 11/2020 | Vieira | ................... | H04L 27/261 |
| 2022/0166580 A1* | 5/2022 | Zhu | ...................... | H04L 27/2613 |

OTHER PUBLICATIONS

Mitsubishi Electric: "Considerations on Numerology for Support of Flexible Guard Lengths", 3GPP TSG-RAN WG1 #86, 3GPP Draft, R1-166225-NUMEROLOGY_MITSUBISHI, 3rd Generation Partnership Project (3GPP), Mobile Competence Centre, 650, Route Des Lucioles, F-06921 Sophia-Antipolis Cedex, France, vol. RAN WG1, No. Goteborg, Sweden, Aug. 22, 2016-Aug. 26, 2016, 4 Pages, Aug. 21, 2016 (Aug. 21, 2016), XP051140128, Retrieved from the Internet: URL: http://www.3gpp.org/ftp/Meetings_3GPP_SYNC/RAN1/Docs/ [retrieved on Aug. 21, 2016] section 2.

* cited by examiner

CONFIGURABLE CYCLIC PREFIX LENGTHS FOR SINGLE CARRIER WAVEFORMS

FIELD OF TECHNOLOGY

The following relates to wireless communications, including configurable cyclic prefix (CP) lengths for single carrier waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices may use cyclic prefixes (CPs) in orthogonal frequency division multiplexing (OFDM) signal generation. In some frequency bands (e.g., relatively high frequency bands, such as sixty gigahertz (GHz) bands and above), a number of communication factors may determine a minimum CP length for OFDM signals. Using a single CP length or a relatively small set of CP lengths (e.g., normal and extended CP lengths) may reduce the flexibility of communications, resulting in inefficient resource usage. Furthermore, using different CP lengths for OFDM waveforms may result in different numbers of symbols per slot. Such symbol-level misalignment may reduce the compatibility of wireless devices in a wireless network. For example, if different wireless devices operate with different symbol-level alignments in a slot, a network may fail to effectively schedule communications and share a frequency band between the different wireless devices.

SUMMARY

The described techniques relate to improved methods, systems, devices, and apparatuses that support configurable cyclic prefix (CP) lengths for single carrier waveforms. Generally, the described techniques provide for a network to dynamically configure a CP length for single carrier waveform communications to adapt to one or more communication factors (e.g., a delay spread for a physical propagation channel, a beam switching delay, an operating carrier-to-interference-plus-noise ratio (CINR), or any combination of these or other factors). For example, some systems may support wireless communications in relatively high frequency millimeter wave (mmW) bands, such as frequency range 4 (FR4) or other frequency ranges (e.g., sixty gigahertz (GHz) and above). To support such communications, a base station may dynamically configure a CP length for single carrier waveform communications. The base station may transmit a configuration message to a user equipment (UE) indicating a configured CP length. In some examples, the UE may provide channel feedback information to the base station, and the base station may configure the UE with the CP length based on the feedback. A single carrier waveform with the configured CP length may maintain a symbol-level alignment with other supported waveforms, such as orthogonal frequency division multiplexing (OFDM) waveforms. Maintaining the symbol-level alignment between single carrier waveforms using configurable CP lengths and OFDM waveforms may support compatibility between wireless devices and scheduling of wireless devices using the single carrier waveforms and wireless devices using the OFDM waveforms in a same frequency band of a wireless communications system.

A method for wireless communications at a UE is described. The method may include receiving a configuration message indicating a UE-specific CP length for communicating with a base station and communicating with the base station using a single carrier waveform and a CP based on the UE-specific CP length, where the communicating includes transmitting or receiving a signal in one or more symbols aligning in a time domain with one or more corresponding symbols of a reference OFDM waveform.

An apparatus for wireless communications is described. The apparatus may include a processor, memory coupled with the processor, and instructions stored in the memory. The instructions may be executable by the processor to cause the apparatus to receive a configuration message indicating a UE-specific CP length for communicating with a base station and communicate with the base station using a single carrier waveform and a CP based on the UE-specific CP length, where the communicating includes transmitting or receiving a signal in one or more symbols aligning in a time domain with one or more corresponding symbols of a reference OFDM waveform.

Another apparatus for wireless communications is described. The apparatus may include means for receiving a configuration message indicating a UE-specific CP length for communicating with a base station and means for communicating with the base station using a single carrier waveform and a CP based on the UE-specific CP length, where the communicating includes transmitting or receiving a signal in one or more symbols aligning in a time domain with one or more corresponding symbols of a reference OFDM waveform.

A non-transitory computer-readable medium storing code for wireless communications at a UE is described. The code may include instructions executable by a processor to receive a configuration message indicating a UE-specific CP length for communicating with a base station and communicate with the base station using a single carrier waveform and a CP based on the UE-specific CP length, where the communicating includes transmitting or receiving a signal in one or more symbols aligning in a time domain with one or more corresponding symbols of a reference OFDM waveform.

In some examples of the method, apparatuses, and non-transitory computer-readable medium described herein, the communicating may include operations, features, means, or instructions for inserting the CP into each symbol of the one or more symbols based on a channel delay spread and transmitting the signal after the inserting the CP.

In some examples of the method, apparatuses, and non-transitory computer-readable medium described herein, the communicating may include operations, features, means, or instructions for determining a symbol corresponding to a beam switching operation, inserting the CP into the determined symbol based on a beam switching delay for the beam switching operation, and transmitting the signal after the inserting the CP.

Some examples of the method, apparatuses, and non-transitory computer-readable medium described herein may further include operations, features, means, or instructions for determining the beam switching delay is greater than a nominal CP length associated with a numerology of a radio access technology (RAT) for the UE, where the symbol corresponding to the beam switching operation is determined and the CP is inserted based on the beam switching delay being greater than the nominal CP length.

Some examples of the method, apparatuses, and non-transitory computer-readable medium described herein may further include operations, features, means, or instructions for determining a nominal CP length based on a numerology of a RAT and refraining from using the nominal CP length for the CP based on receiving the configuration message indicating the UE-specific CP length.

In examples of the method, apparatuses, and non-transitory computer-readable medium described herein, the communicating may include operations, features, means, or instructions for receiving the signal and performing a fast Fourier transform (FFT) on the signal using an FFT size that may be the same for the UE-specific CP length and the nominal CP length.

In some examples of the method, apparatuses, and non-transitory computer-readable medium described herein, the CP includes a set of multiple zero samples. In some examples of the method, apparatuses, and non-transitory computer-readable medium described herein, the UE-specific CP length may be greater than a nominal CP length associated with a numerology of a RAT for the UE.

In some examples of the method, apparatuses, and non-transitory computer-readable medium described herein, the UE-specific CP length may be less than a nominal CP length associated with a numerology of a RAT for the UE and may be based on a discrete Fourier transform (DFT) size. In some examples of the method, apparatuses, and non-transitory computer-readable medium described herein, the communicating may include operations, features, means, or instructions for receiving the signal and performing a DFT on the signal using the DFT size and based on the UE-specific CP length.

Some examples of the method, apparatuses, and non-transitory computer-readable medium described herein may further include operations, features, means, or instructions for transmitting a feedback message to the base station, where the UE-specific CP length may be based on the feedback message.

Some examples of the method, apparatuses, and non-transitory computer-readable medium described herein may further include operations, features, means, or instructions for measuring a channel delay spread between the base station and the UE, where the feedback message indicates the measured channel delay spread and the UE-specific CP length may be based on the measured channel delay spread.

Some examples of the method, apparatuses, and non-transitory computer-readable medium described herein may further include operations, features, means, or instructions for determining a channel delay spread index from a lookup table based on the measured channel delay spread, where the feedback message includes the channel delay spread index.

In some examples of the method, apparatuses, and non-transitory computer-readable medium described herein, the UE-specific CP length includes a first CP length and the method, apparatuses, and non-transitory computer-readable medium may include further operations, features, means, or instructions for determining a second CP length from a set of configured CP lengths, where the feedback message includes a request for the second CP length and the first CP length may be based on the second CP length.

In some examples of the method, apparatuses, and non-transitory computer-readable medium described herein, the feedback message includes a channel state information (CSI) feedback message.

In some examples of the method, apparatuses, and non-transitory computer-readable medium described herein, the configuration message further indicates a bandwidth part (BWP) configuration including at least one or more associations between one or more BWPs and one or more CP lengths and the method, apparatuses, and non-transitory computer-readable medium may include further operations, features, means, or instructions for determining a BWP of the one or more BWPs for communication and determining the UE-specific CP length based on an association of the one or more associations between the determined BWP and the UE-specific CP length.

In some examples of the method, apparatuses, and non-transitory computer-readable medium described herein, the configuration message indicates an active period for the UE-specific CP length and the method, apparatuses, and non-transitory computer-readable medium may include further operations, features, means, or instructions for communicating using the UE-specific CP length during the active period.

Some examples of the method, apparatuses, and non-transitory computer-readable medium described herein may further include operations, features, means, or instructions for determining an expiration of the active period and communicating using a nominal CP length associated with a numerology of a RAT for the UE based on the expiration of the active period.

In some examples of the method, apparatuses, and non-transitory computer-readable medium described herein, the configuration message includes an index value corresponding to the UE-specific CP length of a set of configured CP lengths.

In some examples of the method, apparatuses, and non-transitory computer-readable medium described herein, the configuration message includes an absolute length value for the UE-specific CP length.

In some examples of the method, apparatuses, and non-transitory computer-readable medium described herein, the UE-specific CP length may be based on a channel delay spread, an operating CINR, a beam switching gap threshold, a phase noise mitigation threshold, or a combination thereof.

In some examples of the method, apparatuses, and non-transitory computer-readable medium described herein, the configuration message includes a downlink control information (DCI) message, a medium access control element (MAC-CE), a radio resource control (RRC) message, or a combination thereof.

A method for wireless communications at a base station is described. The method may include transmitting, to a UE, a configuration message including a UE-specific CP length and communicating with the UE using a single carrier waveform and a CP based on the UE-specific CP length, where the communicating includes transmitting or receiving a signal in one or more symbols aligning in a time domain with one or more corresponding symbols of a reference OFDM waveform.

An apparatus for wireless communications is described. The apparatus may include a processor, memory coupled with the processor, and instructions stored in the memory. The instructions may be executable by the processor to cause the apparatus to transmit, to a UE, a configuration message including a UE-specific CP length and communicate with the UE using a single carrier waveform and a CP based on the UE-specific CP length, where the communicating includes transmitting or receiving a signal in one or more symbols aligning in a time domain with one or more corresponding symbols of a reference OFDM waveform.

Another apparatus for wireless communications is described. The apparatus may include means for transmitting, to a UE, a configuration message including a UE-specific CP length and means for communicating with the UE using a single carrier waveform and a CP based on the UE-specific CP length, where the communicating includes transmitting or receiving a signal in one or more symbols aligning in a time domain with one or more corresponding symbols of a reference OFDM waveform.

A non-transitory computer-readable medium storing code for wireless communications at a base station is described. The code may include instructions executable by a processor to transmit, to a UE, a configuration message including a UE-specific CP length and communicate with the UE using a single carrier waveform and a CP based on the UE-specific CP length, where the communicating includes transmitting or receiving a signal in one or more symbols aligning in a time domain with one or more corresponding symbols of a reference OFDM waveform.

Some examples of the method, apparatuses, and non-transitory computer-readable medium described herein may further include operations, features, means, or instructions for performing one or more channel measurements for one or more uplink signals and determining the UE-specific CP length based on the one or more channel measurements.

Some examples of the method, apparatuses, and non-transitory computer-readable medium described herein may further include operations, features, means, or instructions for receiving a feedback message from the UE and determining the UE-specific CP length based on the feedback message.

Some examples of the method, apparatuses, and non-transitory computer-readable medium described herein may further include operations, features, means, or instructions for determining the UE-specific CP length based on a channel delay spread, an operating CINR, a beam switching gap threshold, a phase noise mitigation threshold, or a combination thereof.

In some examples of the method, apparatuses, and non-transitory computer-readable medium described herein, the CP includes a set of multiple zero samples and the communicating may include operations, features, means, or instructions for inserting the CP into the one or more symbols, maintaining phase continuity in connection with inserting the CP, and transmitting the signal based on inserting the CP and maintaining the phase continuity.

DETAILED DESCRIPTION

Figure 1:
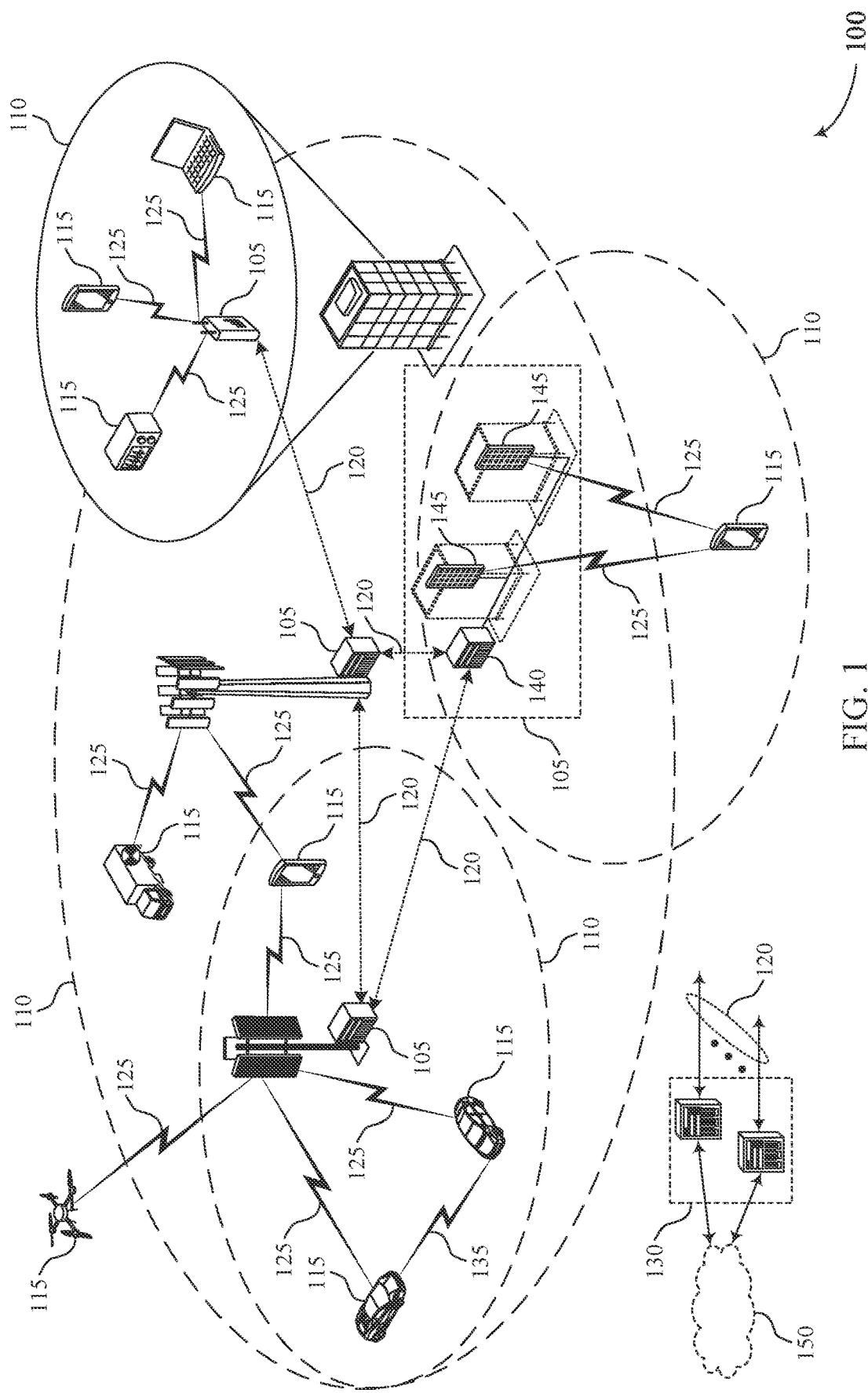
FIGS. 1 and 2 illustrate examples of wireless communications systems that support configurable cyclic prefix (CP) lengths for single carrier waveforms in accordance with aspects of the present disclosure.

In some wireless communications systems, wireless devices may use cyclic prefixes (CPs) in orthogonal frequency division multiplexing (OFDM) signal generation. In some frequency bands (e.g., relatively high frequency bands, such as a sixty gigahertz (GHz) band or above), a number of communication factors may determine a threshold CP length for OFDM signals. Using a single CP length or a relatively small set of CP lengths (e.g., normal and extended CP lengths) may reduce the flexibility of communications, resulting in inefficient resource usage. Furthermore, using different CP lengths for OFDM waveforms may result in different numbers of symbols per slot. Such symbol-level misalignment may reduce the compatibility of wireless devices in a wireless network. For example, if different wireless devices operate with different symbol-level alignments in a slot, a network may fail to effectively schedule communications and share a frequency band between the different wireless devices. Additionally, a wireless device switching between using waveforms with different symbol-level alignments may inefficiently utilize the available resources during the switching procedure based on the symbol-level misalignment.

Some wireless communications systems may support configurable CP lengths for single carrier waveforms to adapt to one or more communication factors. For example, a wireless communications system may support single carrier waveform communications in a relatively high frequency band, OFDM waveform communications in the relatively high frequency band, or both. A single carrier waveform, as opposed to an OFDM waveform, may support flexible CP configuration. For example, a single carrier waveform may include a dynamically configured CP length (e.g., a user equipment (UE)-specific CP length) while maintaining frame alignment, slot alignment, and symbol-level alignment with other waveforms, such as OFDM waveforms. As such, a wireless communications system implementing configurable CP lengths for single carrier waveforms may support different wireless devices communicating in the same frequency band (e.g., a relatively high frequency band) using single carrier waveforms with configured CP lengths and using OFDM waveforms, while maintaining compatibility and scheduling flexibility based on the symbol-level alignment between the single carrier waveforms and the OFDM waveforms. Additionally, the wireless devices may use a common numerology to allow for a uniform transceiver design to communicate single carrier waveforms with configured CP lengths and OFDM waveforms. For example, a wireless device may use the same sampling rate, the same fast Fourier transform (FFT) size, or both for communicating single carrier waveforms (e.g., with configurable CP lengths) and OFDM waveforms. Accordingly, in some cases, a wireless device may efficiently switch between using a single carrier waveform with configurable CP lengths and using an OFDM waveform while maintaining a same symbol-level alignment and a same transceiver design.

A base station may configure a UE with a UE-specific CP length for single carrier waveforms. For example, the base station may determine a CP length based on one or more metrics, such as a channel delay spread, a beam switching delay, or other metrics. In some examples, the base station may measure one or more uplink channel metrics and may select the CP length based on the measurements. Additionally or alternatively, the UE may transmit a feedback message to the base station indicating a delay spread, a requested CP length, or both, and the base station may determine the CP length based on the feedback message. The base station may transmit a configuration message to the UE indicating the configured CP length for the UE. The UE may receive the configuration message and may communicate using CPs of the configured CP length. For example, the UE may communicate with the base station through transmittal or receipt of a signal in one or more symbols using a single carrier waveform and a CP of the indicated CP length. The one or more symbols on which the signal is communicated may align in a time domain with one or more corresponding symbols for another waveform (e.g., a reference waveform) supported in the same frequency band, such as an OFDM waveform. The UE, the base station, or both may insert a CP of the configured CP length into a beam switching symbol to mitigate a beam switching delay, into each symbol of a set of symbols to mitigate a channel delay spread, or both.

Aspects of the disclosure are initially described in the context of wireless communications systems. Additional aspects of the disclosure are described with reference to CP insertion to handle a beam switching symbol and CP length configuration to handle a delay spread. Aspects of the disclosure are further illustrated by and described with reference to apparatus diagrams, system diagrams, and flowcharts that relate to configurable CP lengths for single carrier waveforms.

FIG. 1 illustrates an example of a wireless communications system 100 that supports configurable CP lengths for single carrier waveforms in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a CP. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the CP prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may support communications in relatively high frequency bands (e.g., the 60 GHz frequency band or above). For example, the wireless communications system 100 may support wireless devices operating in frequency range 4 (FR4) or other frequency ranges. In some cases, the wireless communications system 100 may support compatibility between operations in the relatively high frequency bands (e.g., FR4 and above) and operations in relatively low frequency bands (e.g., frequency range 1 (FR1), frequency range 2 (FR2), FR2 extended (FR2x)). The frequency resources of a relatively high frequency band may support higher spectral efficiency, larger spectrum allocations, and larger bandwidths than frequency resources of a relatively low frequency band. For example, each channel of the 60 GHz frequency band may span up to a 2.16 GHz bandwidth. Such a bandwidth may use a relatively large subcarrier spacing (SCS) for OFDM waveforms to support FFT implementation.

One or more aspects of communications may determine a threshold CP length for a waveform. For example, a relatively large SCS in a relatively high frequency band may correspond to a relatively short symbol duration, resulting in significant overhead associated with a CP in a symbol. Additionally or alternatively, the length of a CP may be used to cover a delay spread of a physical propagation channel, where the delay spread may depend on a deployment scenario in the wireless communications system 100. For example, an outdoor deployment scenario may correspond to a larger delay spread than an indoor deployment scenario. In some examples, beamforming in mmW bands may reduce the delay spread following beamforming operations. Furthermore, a length of the CP may reflect an operational signal-to-noise ratio (SNR) or other channel metric. However, in a relatively high frequency band, a relatively high operating SNR may not be feasible due to a relatively high phase/radio frequency (RF) noise, power constraint, or both associated with the frequency band. Accordingly, a wireless device may refrain from using a relatively large CP in some cases, even in the presence of relatively large delay spreads. Alternatively, a wireless device may use a relatively large CP in some cases, such as in a symbol including a beam switching operation, to accommodate a relatively larger beam switching delay (e.g., beam switching gap) in the relatively high frequency band.

In some cases, wireless devices (e.g., UEs 115 and base stations 105) may communicate using OFDM signals. However, configuring different CP lengths for OFDM waveforms may be limited by fixed SCS and slot duration parameters for the OFDM waveforms. Additionally, different CP lengths for OFDM waveforms may result in different numbers of symbols per slot, causing symbol-level misalignment between the OFDM waveforms. For example, a UE 115 may support two CP lengths for OFDM waveforms, a normal CP and an extended CP. However, the normal CP configuration and the extended CP configuration may be misaligned at the symbol-level, reducing the inter-operability of wireless devices using the normal CP and wireless devices using the extended CP. Additionally, supporting two CP lengths may fail to provide enough flexibility at relatively high frequency bands with varying CP length use cases. As such, the wireless communications system 100 may refrain from supporting configurable CP lengths for OFDM waveforms (e.g., configurable beyond the normal CP and the extended CP).

To support configurable CP lengths, the wireless communications system 100 may use single carrier waveforms with configurable CP lengths. For example, the wireless communications system 100 may support single carrier waveform communications in a relatively high frequency band, OFDM waveform communications in the relatively high frequency band, or both. In some cases, a wireless device (e.g., a UE 115 or a base station 105) may use a single carrier waveform for improved energy efficiency (e.g., as compared to using an OFDM waveform). Generating a single carrier waveform may involve a lower peak-to-average power ratio (PAPR) than generating an OFDM waveform. As such, the same power amplifier may generate a single carrier waveform with a lower direct current (DC) input driving the power amplifier than would be used to generate an OFDM waveform. Accordingly, as compared to OFDM communications, a wireless device using single carrier communications may use a power amplifier at a higher efficiency mode, effectively saving battery life at the wireless device. The wireless device using the single carrier waveform may still achieve a relatively high data rate in the relatively high frequency band by using a larger portion of the available frequency spectrum.

A wireless device using a single carrier waveform may insert a CP into the single carrier waveform to support frequency domain equalization and achieve OFDM-like blocks or symbols. Inserting the CP into the single carrier waveform may allow a wireless device to apply an FFT to the single carrier waveform. The inserted CP may be an example of a repeated portion of the signal, a gap insertion (GI) or unique word (UW) CP, a zero-based CP (e.g., including a number of zero samples), or any combination thereof. A single carrier waveform, as opposed to an OFDM waveform, may support flexible CP configuration. For example, a single carrier waveform may include a dynamically configured CP length while maintaining frame alignment, slot alignment, and symbol-level alignment with other waveforms, such as OFDM waveforms. As such, a wireless communications system 100 implementing configurable CP lengths for single carrier waveforms may support different wireless devices communicating in the same frequency band (e.g., a relatively high frequency band) using single carrier waveforms with configured CP lengths and using OFDM waveforms, while maintaining compatibility and scheduling flexibility based on the symbol-level alignment between the single carrier waveforms and OFDM waveforms. Additionally, the wireless devices may use a common radio access technology (RAT) numerology to allow for a uniform transceiver design to communicate single carrier waveforms with configured CP lengths and OFDM waveforms. For example, a wireless device may use the same sampling rate, the same FFT size, or both for communicating single carrier waveforms (e.g., with configurable CP lengths) and OFDM waveforms. Accordingly, in some cases, a wireless device (e.g., a UE 115) may efficiently switch between using a single carrier waveform (e.g., with configurable CP lengths) and using an OFDM waveform while maintaining a same timing structure (e.g., based on symbol-level alignment) and a same transceiver.

Figure 2:
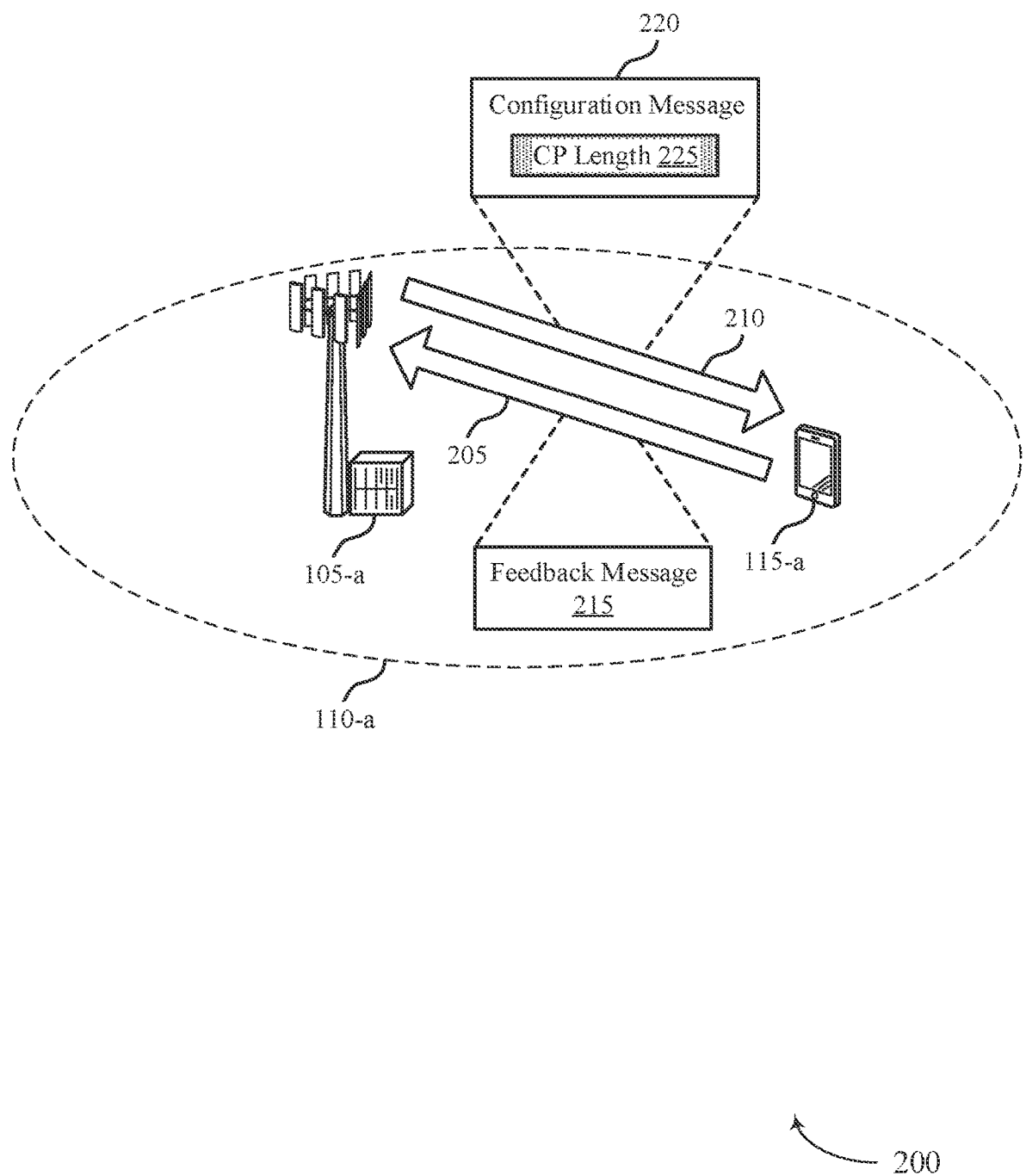

FIG. 2 illustrates an example of a wireless communications system 200 that supports configurable CP lengths for single carrier waveforms in accordance with aspects of the present disclosure. The wireless communications system 200 may include aspects of a wireless communications system 100 as described with reference to FIG. 1. For example, the wireless communications system 200 may include a base station 105-*a* and a UE 115-*a*, which may be examples of the corresponding wireless devices described with reference to FIG. 1. The base station 105-*a* may serve a geographic coverage area 110-*a*. In some cases, the base station 105-*a* and the UE 115-*a* may communicate in a relatively high frequency band (e.g., the 60 GHz band or above). The base station 105-*a* may dynamically configure a CP length 225 for the UE 115-*a*, the base station 105-*a*, or both to use for single carrier waveforms in the relatively high frequency band.

The base station 105-*a* may determine a length of a CP based on one or more communication factors. For example, the base station 105-*a* may determine a CP length 225 based on a delay spread for a physical propagation channel, an operating carrier-to-interference-plus-noise ratio (CINR), a beam switching delay, a phase noise mitigation threshold (e.g., using a GI CP), or any combination thereof. The determined CP length 225 may allow the wireless devices to maintain a symbol-level alignment between the single carrier waveform and other waveforms (e.g., reference waveforms) supported in the same frequency band, such as OFDM waveforms (e.g., using CPs), DFT-s-OFDM waveforms, DFT-s-FDM waveforms, or any other waveforms, including other single carrier waveforms using different CP lengths 225.

The base station 105-*a* may transmit a configuration message 220 to a UE 115-*a* on a downlink channel 210, the configuration message 220 indicating the configured CP length 225 for the UE 115-*a* (e.g., a UE-specific CP length). The UE 115-*a* may receive the configuration message 220 and may communicate with the base station 105-*a* according to the configured CP length 225. For example, the UE 115-*a* may transmit signals including one or more CPs of the configured CP length 225, receive signals including one or more CPs of the configured CP length 225, or both. The UE 115-*a* may use the configured CP length 225 for single carrier waveform communications and may refrain from using the configured CP length 225 for other types of waveform communications. For example, the UE 115-*a* may not use the configured CP length 225 for OFDM waveform communications and may instead use a normal CP or extended CP configuration. That is, the UE-specific CP length configured by the base station 105-*a* may be different from both a normal CP length and an extended CP length. For example, the configured CP length 225 may be configured from a set of X supported CP length values, where X is greater than two.

In some cases, the UE 115-*a* may be configured (e.g., pre-configured) with a nominal CP length for single carrier waveforms. Additionally or alternatively, the base station 105-*a* may be configured with the nominal CP length. The nominal CP length may be an example of a default CP length defined for a specific numerology. For example, the UE 115-*a*, the base station 105-*a*, or both may identify a default CP length associated with a specific numerology of a RAT. The UE 115-*a* may update from using the nominal CP length to using a dynamically configured CP length 225 (e.g., a UE-specific CP length) based on receiving the configuration message 220. For example, the UE-specific CP length configured for the UE 115-*a* may be different from the nominal CP length associated with a numerology of the RAT for the UE 115-*a* (e.g., used by the UE 115-*a*).

The configuration message 220 may be an example of a layer 1 (L1) configuration message, a layer 2 (L2) configuration message, a layer 3 (L3) configuration message, or any combination thereof. In a first example, the configuration message 220 may be an example of a downlink control information (DCI) message. The DCI message may include a field indicating a CP length 225. In some examples, the field may include a set of bits indicating a CP length value (e.g., the set of bits may indicate a number of units in time spanned by the CP length 225). In some other examples, the field may include a set of bits indicating a CP length index corresponding to a lookup table. The base station 105-*a* and the UE 115-*a* may store a lookup table including a set of CP lengths 225 and corresponding CP length indexes. The UE 115-*a* receiving the configuration message 220 may determine the CP length index indicated by the configuration message 220 and determine the corresponding CP length value from the lookup table. In some examples, the lookup table may be pre-configured at the UE 115-*a*. In some other examples, the base station 105-*a* may configure the UE 115-*a* with a CP length lookup table for single carrier waveforms.

In a second example, the configuration message 220 may be an example of a medium access control element (MAC-CE). The MAC-CE may include a field indicating a CP length 225. For example, the field may include a set of bits indicating a CP length value or a CP length index corresponding to a CP length value based on an association in a lookup table. The size of the field may determine the number of possible CP lengths 225 supported for single carrier waveforms in the wireless communications system 200. For example, a 4-bit field may support 16 possible field values corresponding to up to 16 supported CP lengths 225.

In a third example, the configuration message 220 may be an example of a radio resource control (RRC) message. The RRC message may include a field indicating a CP length 225. For example, the field may include a set of bits indicating a CP length value or a CP length index corresponding to a CP length value based on an association in a lookup table. In some examples, the configuration message 220 may be transmitted by the base station 105-*a* to indicate the configured CP length 225. In some other examples, the configuration message 220 may be transmitted for another reason (e.g., to grant resources for communication), but may additionally include the indication of the CP length 225. The base station 105-*a* may transmit the configuration message 220 to a specific UE 115 to indicate a UE-specific CP length 225 or may broadcast the configuration message 220 to multiple UEs 115 to indicate a shared CP length 225 for a set of UEs 115.

In some examples, the CP length 225 may be bundled with a bandwidth part (BWP) configuration. For example, the base station 105-*a* may configure the UE 115-*a* with a specific CP length 225 for single carrier waveforms for a specific BWP. In some cases, the correlation between the CP length 225 and the BWP may be implicit; for example, the UE 115-*a* may be configured with both a BWP and a CP length 225 for communication, and the UE 115-*a* may determine that the CP length 225 is for the specific BWP based on the configuration. In some other cases, the correlation between the CP length 225 and the BWP may be explicit; for example, the configuration message 220 may indicate one or more CP lengths 225 corresponding to one or more respective BWPs using BWP indices. The configuration message 220 may include a field indicating a BWP index and a field indicating a corresponding CP length 225 or may include a field indicating an array of BWP indexes and a field indicating an array of the same length including corresponding CP lengths 225.

In some examples, the base station 105-*a* may determine the CP length 225 based on measuring one or more signals on an uplink channel 205. For example, the base station 105-*a* may determine a delay spread (e.g., a channel delay profile) associated with one or more signals received on the uplink channel 205 and may determine the CP length 225 based on the measured delay spread. In some cases, the delay spread associated with the uplink channel 205 may correspond to a delay spread (e.g., a similar delay spread) associated with the downlink channel 210. Additionally or alternatively, the base station 105-*a* may measure one or more channel metrics (e.g., SNR, CINR) and may select the CP length 225 based on the one or more channel metrics.

In some cases, the UE 115-*a* may provide feedback to the base station 105-*a*, and the base station 105-*a* may use the feedback to determine the CP length 225. For example, the UE 115-*a* may transmit a feedback message 215 on the uplink channel 205 to the base station 105-*a*. The feedback message 215 may be an example of a channel state information (CSI) feedback message. In some examples, the feedback message 215 may include a field indicating a beam switching gap threshold for the UE 115-*a*, a field indicating phase noise handling for the UE 115-*a*, a field indicating a delay spread for the downlink channel 210, or any combination thereof. The base station 105-*a* may receive the feedback message 215 and may configure a CP length 225 for the UE 115-*a* based on one or more fields in the feedback message 215, one or more measurements at the base station 105-*a*, or a combination thereof. In some examples, the base station 105-*a* may initially determine a CP length 225 for the UE 115-*a*, receive a feedback message 215, and may update the determined CP length 225 based on information in the feedback message 215.

The UE 115-*a* may indicate a channel delay spread to the base station 105-*a* or request a specific CP length 225 from the base station 105-*a* using the feedback message 215. In some examples, the UE 115-*a* may measure a channel delay spread for the downlink channel 210 and may indicate the measured delay spread value in a field of the feedback message 215. The UE 115-*a* may indicate the exact measured delay spread value or may indicate a similar delay spread value. For example, the UE 115-*a* may be configured (e.g., pre-configured or dynamically configured) with a quantized delay spread table. The UE 115-*a* may identify a delay spread value from the quantized delay spread table that is closest to the measured delay spread value and may indicate the identified delay spread value in the feedback message 215 (e.g., using an index). The base station 105-*a* may determine a CP length 225 based on the delay spread value indicated by the feedback message 215. In some other examples, the UE 115-*a* may be configured (e.g., pre-configured or dynamically configured) with a set of supported CP lengths 225. In some examples, the UE 115-*a* may include a mapping function, a table, an algorithm, or some combination thereof to determine a CP length 225 from the set of supported CP lengths 225 corresponding to a measured delay spread value. The UE 115-*a* may measure a delay spread value for the downlink channel 210, select a CP length 225 from the set of supported CP lengths 225 corresponding to the measured delay spread value, and include a request for the selected CP length 225 in the feedback message 215. The base station 105-a may configure the UE 115-a with the requested CP length 225 (e.g., via a configuration message 220) or with another CP length 225.

The UE 115-a may indicate a long-term delay spread value, short-term delay spread values, or both. For example, the UE 115-a may measure a delay spread for the downlink channel 210 over a period of time and may feedback a delay spread value based on the measurements (e.g., an average delay spread value for the period of time, a root mean square (RMS) of the delay spread for the period of time, or another value). Additionally or alternatively, the UE 115-a may measure per-slot delay spreads and may feedback the per-slot delay spread values (e.g., in a single feedback message 215 or in multiple feedback messages 215).

In some examples, the UE 115-a may operate according to a configured CP length 225 received in a configuration message 220 until a new configuration message 220 with a different CP length 225 is received. In some other examples, the UE 115-a may operate according to the configured CP length 225 for an active period and may switch back to a nominal CP length upon expiration of the active period. If the UE 115-a receives a new configuration message 220 with a CP length 225 (e.g., during the active period or after the active period), the UE 115-a may start or restart a new active period for the CP length 225 indicated by the new configuration message 220. In some cases, the active period duration may be defined at the UE 115-a. In some other cases, the configuration message 220 may indicate the active period duration for the CP length 225 (e.g., in a bit field).

Accordingly, the UE 115-a may receive a configured CP length 225 from the base station 105-a and use the configured CP length 225 for single carrier waveform communications. In some cases, the UE 115-a may use the configured CP length 225 in a specific symbol (e.g., to mitigate a beam switching delay). In some other cases, the UE 115-a may use the configured CP length 225 in each symbol (e.g., to mitigate a delay spread for a channel). The UE 115-a may use the configured CP length 225 to generate a single carrier waveform for transmission, to receive a single carrier waveform from the base station 105-a, or both. In some cases, by using the configurable CP length 225 for single carrier waveforms, the wireless communications system 200 may allow CP lengths 225 to be configured to any value (e.g., not just a small set of configured values). In some other cases, the wireless communications system 200 may support a relatively large set of CP lengths 225 that may be dynamically configured by the wireless network or may be defined at the wireless network (e.g., in a lookup table). Such configurability of CP lengths 225 for single carrier waveforms may provide the wireless communications system 200 flexibility in handling a number of different channel conditions, especially in relatively high frequency bands (e.g., FR4 and above).

Figure 3:
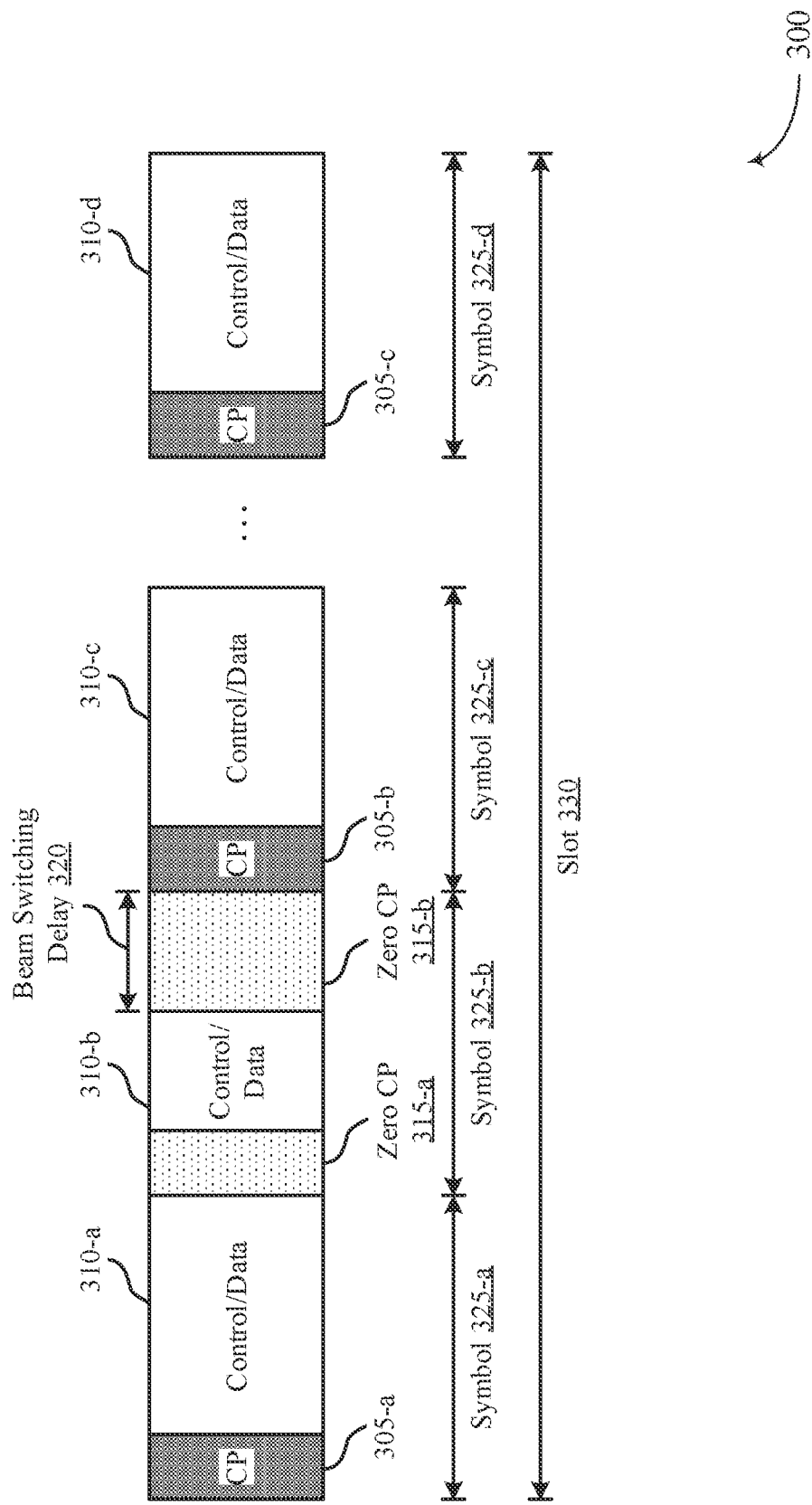
FIG. 3 illustrates an example of CP insertion to handle a beam switching symbol that supports configurable CP lengths for single carrier waveforms in accordance with aspects of the present disclosure.

FIG. 3 illustrates an example of CP insertion 300 to handle a beam switching symbol that supports configurable CP lengths for single carrier waveforms in accordance with aspects of the present disclosure. The CP insertion 300 may include aspects of a wireless communications system 100 or 200 as described with reference to FIGS. 1 and 2. For example, a wireless device, such as a UE 115 or a base station 105, may perform the CP insertion 300 based on a configured CP length. The CP insertion 300 may allow a wireless device to efficiently use the available resources when performing a beam switching procedure.

A wireless device (e.g., a UE 115, a base station 105) operating using beamformed communications may perform a beam switching procedure to select a beam for communication. For example, if the wireless device is mobile or is communicating with a mobile device, the beam switching procedure may allow the devices to maintain a connection as the relative positions of the devices change. The beam switching procedure may involve transmitting or receiving messages in multiple different beam directions, updating a precoding process, or both, which may involve an amount of time referred to as a beam switching delay 320. During the beam switching delay 320, the wireless device may fail to transmit or receive control or data information. In some other systems, if the beam switching delay is greater than a CP length (e.g., a default CP length, a normal CP length, an extended CP length), the wireless device may fail to utilize a symbol in which the beam switching procedure occurs (e.g., outside a CP).

In contrast, a wireless communications system may use the CP insertion 300 to effectively use each symbol despite the beam switching delay 320. For example, the wireless device may be configured with a CP length that is at least as long as the beam switching delay. The wireless device may insert the CP (e.g., a zero-based CP) of the configured CP length in the beam switching symbol to utilize the remaining portions of the beam switching symbol. Specifically, for the switching symbol, the wireless device may pad zeros around the useful signal (e.g., control or data signaling) and perform a same FFT operation. The number of zero samples used for the beam switching symbol may depend on the beam switching delay 320, while the non-zero samples in the beam switching symbol may carry useful control or data information. In some examples, the configured CP length to handle beam switching may be greater than a nominal CP length used in other symbols.

For example, a UE 115 may initially communicate with a base station 105 using a first communication beam in a first symbol 325-a. The UE 115 may insert a CP 305-a of a nominal CP length (or a first configured CP length for non-beam switching symbols) and communicate control or data information 310-a in the first symbol 325-a. In a symbol 325-b, the UE 115 may perform a beam switching procedure to switch to operating using a second communication beam. In some cases, the UE 115 may communicate using the first communication beam in the beam switching symbol 325-b prior to performing the beam switching procedure. In some other cases, the UE 115 may perform the beam switching procedure and then communicate using the second communication beam in the beam switching symbol 325-b. As illustrated, the UE 115 may insert a zero-based CP 315-a (e.g., of the nominal CP length or the first configured CP length), communicate the control or data information 310-b, and insert a zero-based CP 315-b of the configured CP length (e.g., a second configured CP length for beam switching symbols). The UE 115 may perform the beam switching procedure during the zero-based CP 315-b, such that the beam switching delay 320 occurs when control or data information is not being communicated. As such, the UE 115 may effectively utilize the beam switching symbol 325-b.

Following the beam switching procedure, the UE 115 may communicate in subsequent symbols 325 using the second communication beam. For example, the UE 115 may insert a CP 305-b of the nominal CP length (or the first configured CP length for non-beam switching symbols) and communicate control or data information 310-c in the symbol 325-c and may insert a CP 305-c of the nominal CP length (or the first configured CP length for non-beam switching symbols) and communicate control or data information 310-d in the symbol 325-d of the slot 330.

Figure 4:
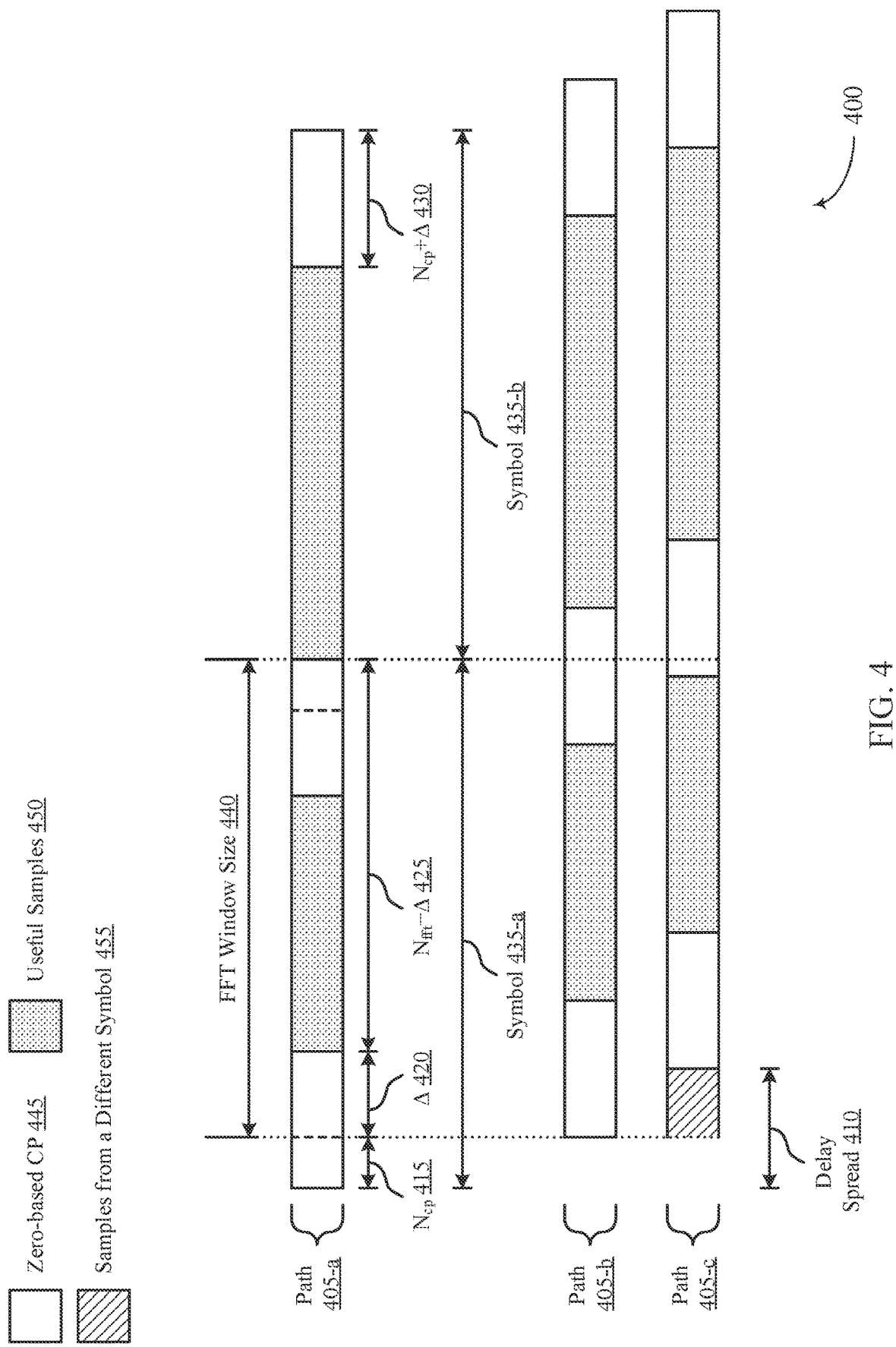
FIG. 4 illustrates an example of CP insertion to handle a channel delay spread that supports configurable CP lengths for single carrier waveforms in accordance with aspects of the present disclosure.

FIG. 4 illustrates an example of CP insertion 400 to handle a channel delay spread that supports configurable CP lengths for single carrier waveforms in accordance with aspects of the present disclosure. The CP insertion 400 may include aspects of a wireless communications system 100 or 200 as described with reference to FIGS. 1 and 2. For example, a wireless device, such as a UE 115 or a base station 105, may perform the CP insertion 400 using a configured CP length. The CP insertion 400 may allow a wireless device to mitigate the negative effects of a physical propagation channel delay spread, improving communication reliability.

In some examples, a wireless device may insert a CP in a signal to mitigate inter-symbol interference due to a delay spread 410 between paths 405 in multi-path reception. For example, a wireless device may receive multiple copies of a same signal transmitted in a symbol 435-a on multiple paths 405. For example, as illustrated, the device may receive useful samples 450 for the symbol 435-a on a first path 405-a, a second path 405-b, and a third path 405-c. The first path 405-a may be an example of an earliest path, while the third path 405-c may be an example of a latest path. The difference in time between the latest path and the earliest path may be the delay spread 410 for the channel. To successfully receive the signal, a transceiver may perform an FFT operation on the signals received on the different arrival paths 405. For example, the transceiver may add the signals on each other and may scale one or more of the signals based on impulse responses sampled at the reception times for the different paths 405. To successfully perform the FFT operation, the transceiver may apply an FFT window of an FFT window size 440 to capture the useful samples 450 of the waveform across the paths 405 without capturing useful samples 450 of a waveform for a different symbol 435 (e.g., a previous symbol 435 or a subsequent symbol 435, such as symbol 435-b).

If the delay spread 410 is longer than a nominal CP length $N_{cp}$ 415, using the nominal CP length $N_{cp}$ 415 may result in the FFT window capturing useful samples 450 of a waveform for a different symbol 435, potentially resulting in errors in the FFT operation. For example, the useful samples 450 of a waveform for a different symbol 435 may break the cyclic property of the waveform. However, changing the FFT window size 440 to accommodate the delay spread 410 may not be supported by a transceiver or may involve significant complexity, processing resources, or both.

Instead, the wireless device may configure a CP length greater than the nominal CP length to support the delay spread 410. Additionally, the wireless device may use a zero-based CP to avoid the same FFT window size 440 capturing useful samples 450 of a waveform for a different symbol 435. For example, the configured CP length may span the nominal CP length $N_{cp}$ 415 plus an additional CP length Δ 420. That is, the configured CP length may be equal to $N_{cp}+\Delta$ 430. As illustrated, the FFT window size 440 may span a length $N_{fft}$, where each symbol 435 includes $N_{fft}+N_{cp}$ total samples. Such an FFT window size 440 may be used for multiple configured CP lengths. For example, the FFT window size 440 may support any CP length from the nominal CP length $N_{cp}$ 415 to a configured CP length $N_{cp}+\Delta$ 430 for any value of Δ 420 if the additional samples included in Δ 420 are replaced by zeros (e.g., to form cyclic convolution). That is, a wireless device may use the nominal FFT window size 440 for frequency domain equalization by using zeros as the CP. The wireless device may further maintain symbol-level alignment with normal CP-based OFDM signals or extended CP-based OFDM signals using the CP insertion 400 with a configured CP length.

By using a zero-based CP of the configured CP length $N_{cp}+\Delta$ 430, the wireless device may include an additional overhead of $N_{cp}+\Delta$ in a first symbol 435-a (e.g., symbol 0 in a slot, a first symbol of a communication) and may include an additional overhead of $N_{cp}$ in subsequent symbols 435, such as symbol 435-b. However, the wireless device may mitigate the negative effects of the delay spread 410 for the physical propagation channel. For example, FIG. 4 illustrates an example of symbol 0 (e.g., the symbol 435-a) receiver processing using a longer zero-based CP (e.g., longer than a nominal CP length $N_{cp}$ 415) to handle the delay spread 410. If the wireless device is configured with a CP length that is at least as long as the delay spread 410 (e.g., total delay spread <$N_{cp}+\Delta$), the wireless device may use the same FFT window size 440 without capturing a waveform from a different symbol 435 in the FFT window. For example, applying the FFT window size 440 of $N_{fft}$ may capture at least part of the previous symbol or a subsequent symbol 435-b. However, if the captured samples from the other symbols 435 are zero samples, the FFT operation may be unaffected and the wireless device may successfully perform the FFT operation regardless. As illustrated, the FFT window may be placed such that it captures the useful samples 450 for the symbol 435-a in each of the paths 405, portions of the zero-based CPs 445 for the paths 405, and samples from a different symbol 455. However, based on the configuration, the samples from the different symbol 455 correspond to a zero-based CP 445 for the preceding symbol and, as such, do not negatively affect the FFT operation. Accordingly, the wireless device may implement the configurable CP length to handle a channel delay spread 410 greater than a nominal CP length, improving reception reliability for the wireless device.

In some examples, one or more wireless devices may maintain phase continuity before and after padding a waveform with zeros (e.g., a zero-based CP 445). Maintaining phase continuity may allow a wireless device to refrain from performing additional channel estimation after each zero padding. Maintaining phase continuity may involve additional complexity at a transmitter. In some cases, some wireless devices (e.g., a base station 105) may maintain phase continuity while other wireless devices (e.g., a UE 115) may not. In some such cases, the CP insertion 400 to handle a channel delay spread 410 using a configured CP length (e.g., $N_{cp}+\Delta$ 430) that is longer than a nominal CP length (e.g., $N_{cp}$ 415) may be used for downlink signaling, where the base station 105 transmitting the signals may maintain phase continuity.

In some cases, a wireless device may apply a configured CP length that is shorter than a nominal CP length (e.g., to handle relatively short delay spreads). For example, the wireless device may be configured with a CP length of $N_{cp}-\Delta$. In some examples, to handle such a configuration, a wireless device may use a discrete Fourier transform (DFT) for frequency domain equalization (e.g., as opposed to using an FFT). A DFT operation using a DFT window size with prime factors 2, 3, and/or 5 may support efficient processing (e.g., similar to the efficient processing provided by an FFT with factors of 2). As such, specific CP length values may be configured that support efficient DFT processing. Table 1 illustrates some example FFT sizes with corresponding nominal CP lengths, as well as supported short CP lengths (e.g., shorter than the nominal CP lengths) and corresponding DFT sizes and factors.

TABLE 1

Example Short CP Lengths and Corresponding DFT Sizes

| FFT Size | Nominal CP | Short CP | DFT Sizes |
|---|---|---|---|
| 4096 | 288/320 | 10 | $4374 = 2 \times 3^7$ |
| 2048 | 144/160 | 5, 32 | $2160 = 2^4 \times 3^3 \times 5$, $2187 = 3^7$ |
| 1024 | 72/80 | 16 | $1080 = 2^3 \times 3^3 \times 5$ |
| 512 | 36/40 | 8 | $540 = 2^2 \times 3^3 \times 5$ |

In some other examples, the wireless device may refrain from performing frequency domain equalization. Instead, the wireless device may perform time domain equalization on the waveform with the short CP length (e.g., shorter than the nominal CP length). For example, a relatively short CP length may indicate a relatively short delay spread, a relatively low CINR, or both, such that time-domain equalization may be effective and involve relatively low complexity. In some cases, the wireless device may apply a nominal FFT to one or more reference signals (e.g., demodulation reference signals (DMRSs)) to obtain a frequency domain equalizer coefficient and may convert back to a time domain equalizer for receiving the signal. Accordingly, a wireless device may support using a nominal CP length, a dynamically configured CP length shorter than the nominal CP length, a dynamically configured CP length longer than the nominal CP length, or any combination thereof.

Figure 5:
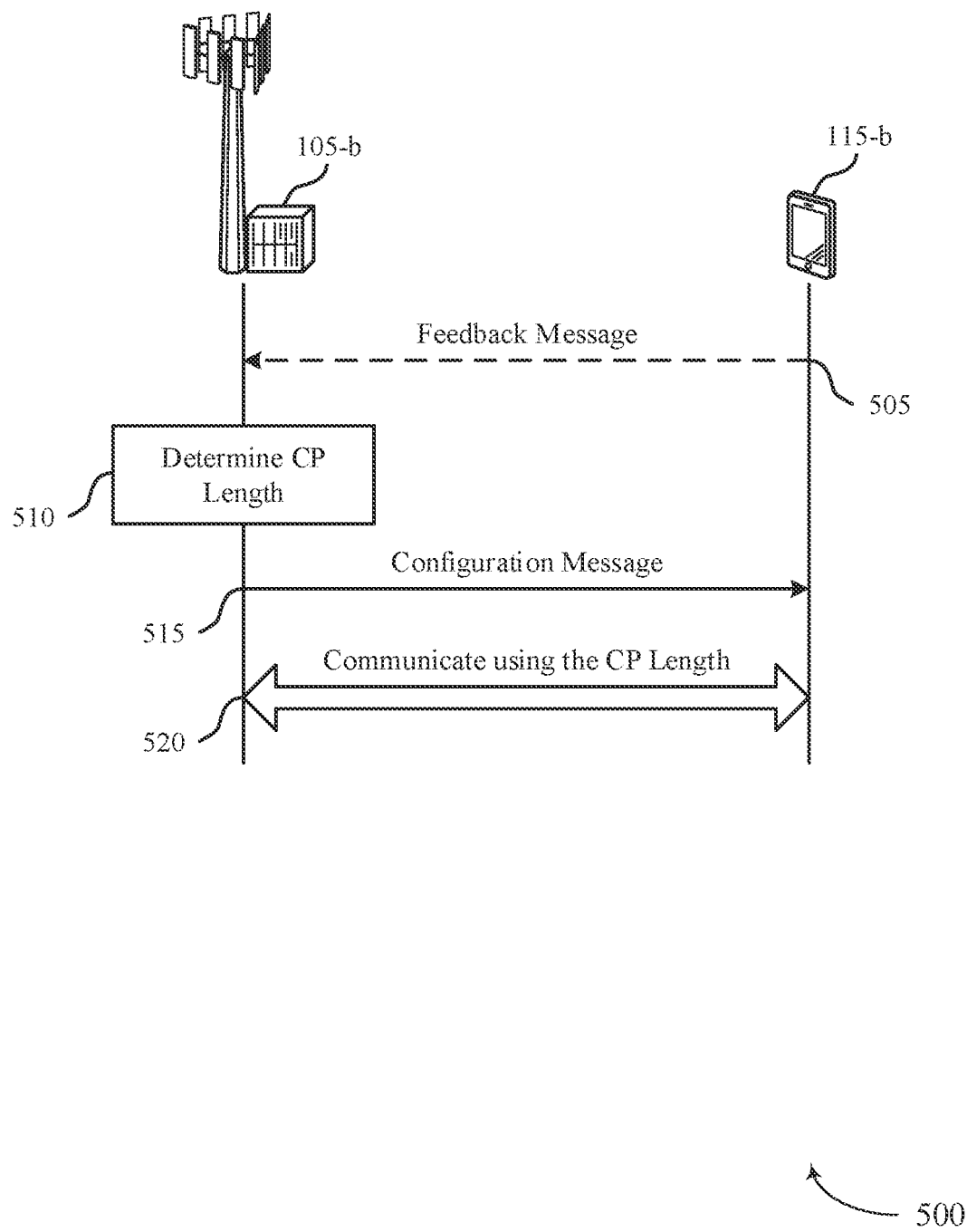
FIG. 5 illustrates an example of a process flow that supports configurable CP lengths for single carrier waveforms in accordance with aspects of the present disclosure.

FIG. 5 illustrates an example of a process flow 500 that supports configurable CP lengths for single carrier waveforms in accordance with aspects of the present disclosure. The process flow 500 may be implemented by a wireless communications system 100 or a wireless communications system 200 as described with reference to FIGS. 1 and 2. The process flow 500 may include a UE 115-*b* and a base station 105-*b*, which may be examples of the corresponding devices described with reference to FIGS. 1 through 4. The base station 105-*b* may configure the UE 115-*b* with a CP length for single carrier waveform communications. Alternative examples of the following may be implemented, where some processes are performed in a different order than described or are not performed at all. In some cases, processes may include additional features not mentioned below, or further processes may be added.

In some cases, at 505, the UE 115-*b* may transmit a feedback message to the base station 105-*b* to indicate a CP length. For example, the UE 115-*b* may measure a channel delay spread between the base station 105-*b* and the UE 115-*b*. In some examples, the UE 115-*b* may indicate the measured channel delay spread in the feedback message. In some other examples, the UE 115-*b* may determine a channel delay spread index from a lookup table based on the measured channel delay spread and may indicate the channel delay spread index in the feedback message. In yet some other examples, the UE 115-*b* may request a specific CP length in the feedback message. The feedback message may be an example of a CSI feedback message.

At 510, the base station 105-*b* may determine a CP length (e.g., a UE-specific CP length for the UE 115-*b*). In some examples, the base station 105-*b* may perform one or more channel measurements for one or more uplink signals and may determine the CP length based on the one or more channel measurements. Additionally or alternatively, the base station 105-*b* may receive the feedback message at 505 and may determine the CP length based on the feedback message. The CP length may be determined based on a channel delay spread, an operating CINR, a beam switching gap threshold (e.g., a beam switching delay), a phase noise mitigation threshold, or a combination thereof.

At 515, the base station 105-*b* may transmit, to the UE 115-*b*, a configuration message indicating the CP length (e.g., determined at 510). The CP length may be an example of a UE-specific CP length configured for the UE 115-*b*. In some examples, the configuration message may include an index value corresponding to the CP length of a set of configured CP lengths (e.g., based on an association in a lookup table). In some other examples, the configuration message may include an absolute length value for the CP length. In some cases, the indicated CP length may correspond to a specific BWP. For example, the configuration message may indicate a BWP configuration including at least one or more associations between one or more BWPs and one or more CP lengths. The configuration message may be an example of a DCI message, a MAC-CE, an RRC message, or a combination thereof.

The UE 115-*b* may receive the configuration message and may use the configured CP length (e.g., the UE-specific CP length). For example, the UE 115-*b* may use a nominal CP length (e.g., based on the RAT numerology). Upon receiving the configuration message, the UE 115-*b* may switch to using the configured CP length and may refrain from using the nominal CP length. The configured CP length may be longer than the nominal CP length or shorter than the nominal CP length.

At 520, the UE 115-*b* may communicate with the base station 105-*b* using the configured CP length. For example, the UE 115-*b* may communicate with the base station 105-*b* through transmittal or receipt of a signal in one or more symbols using a single carrier waveform and a CP of the configured CP length. In some examples, the CP may include a set of zero samples. The one or more symbols on which the signal is communicated may align in a time domain with one or more corresponding symbols for another waveform supported in the same frequency range, such as a reference OFDM waveform. That is, symbol timing for the single carrier waveform with the configurable length CP may align in the time domain with an OFDM reference symbol timing. As such, the UE 115-*b* and the base station 105-*b* may switch between using the single carrier waveform communications and using OFDM waveform communications while efficiently maintaining symbol-level alignment.

In some examples, the communicating may involve the UE 115-*b* or the base station 105-*b* inserting the CP into each symbol of the one or more symbols based on a channel delay spread and transmitting the signal with the inserted CP(s). In some other examples, the communicating may involve the UE 115-*b* or the base station 105-*b* determining a symbol corresponding to a beam switching operation, inserting the CP into the determined symbol based on a beam switching delay for the beam switching operation, and transmitting the signal with the inserted CP. Additionally or alternatively, the communicating may involve the UE 115-*b* or the base station 105-*b* receiving the signal and performing an FFT on the signal using an FFT size that is the same for the configured CP length and for the nominal CP length. The FFT size may further be the same as an FFT size for an OFDM waveform. In some other cases, the communicating may involve the UE 115-*b* or the base station 105-*b* receiving the signal and performing a DFT on the signal using a DFT size based on the configured CP length being less than the nominal CP length.

In some cases, the configuration message may indicate an active period for the indicated CP length, and the UE 115-*b*, the base station 105-*b*, or both may communicate using the indicated CP length during the active period. If the UE 115-*b*, the base station 105-*b*, or both determine an expiration of the active period, the UE 115-*b*, the base station 105-*b*, or both may communicate using the nominal CP length (e.g., associated with the RAT numerology for the UE 115-*b*) based on the expiration of the active period.

Figure 6:
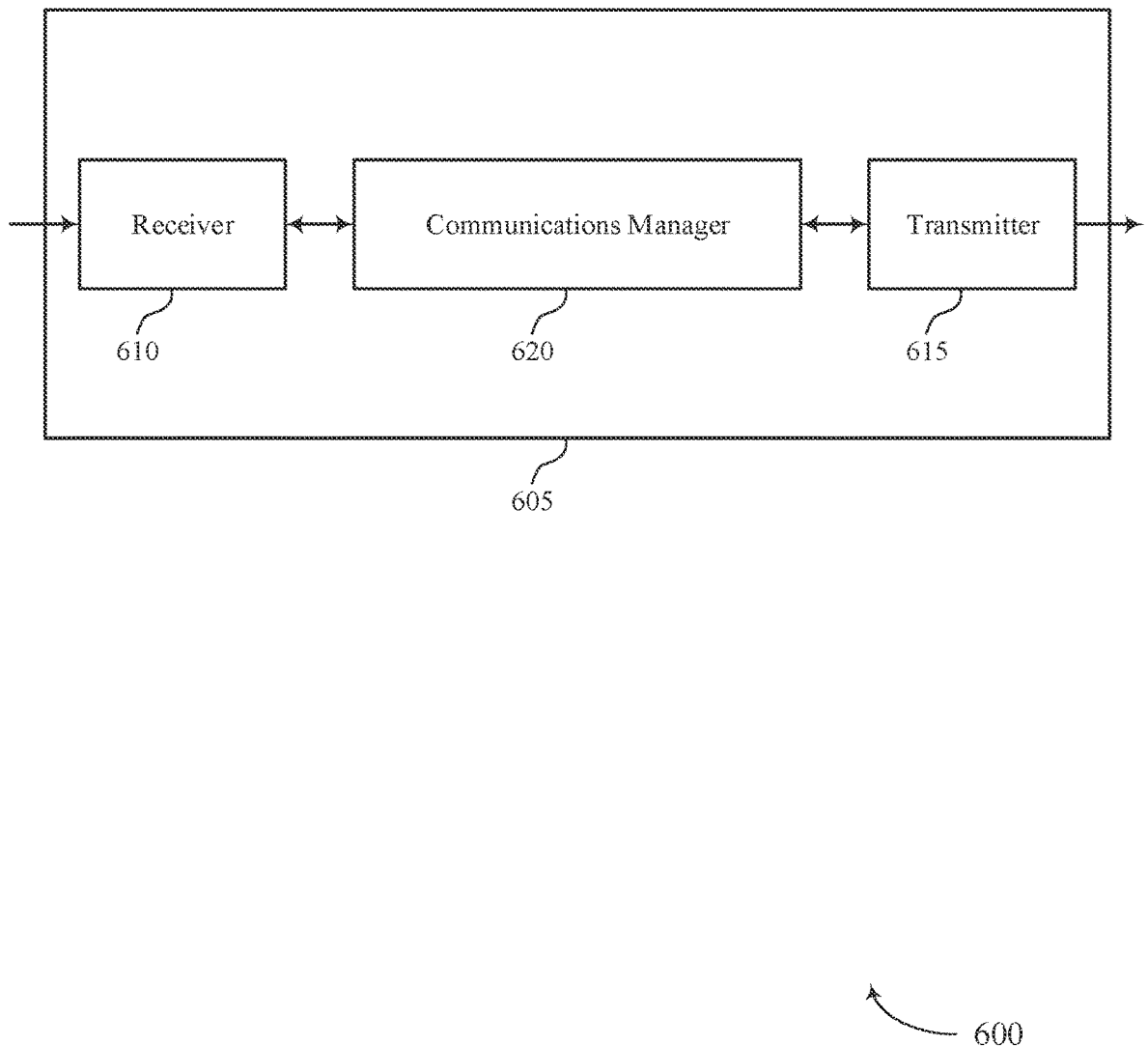
FIGS. 6 and 7 show block diagrams of devices that support configurable CP lengths for single carrier waveforms in accordance with aspects of the present disclosure.

FIG. 6 shows a block diagram 600 of a device 605 that supports configurable CP lengths for single carrier waveforms in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to configurable CP lengths for single carrier waveforms). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to configurable CP lengths for single carrier waveforms). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of configurable CP lengths for single carrier waveforms as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving a configuration message indicating a UE-specific CP length for communicating with a base station. The communications manager 620 may be configured as or otherwise support a means for communicating with the base station using a single carrier waveform and a CP based on the UE-specific CP length, where the communicating involves transmitting or receiving a signal in one or more symbols aligning in a time domain with one or more corresponding symbols of a reference OFDM waveform.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improving communication reliability. For example, by dynamically configuring a CP length, the communications manager 620 may mitigate the negative effects of beam switching delay, channel propagation delay spread, poor CINR (e.g., below a CINR threshold), or any combination thereof. As such, the communications manager 620 may improve communication reliability in beam switching symbols, symbols with significant (e.g., above a threshold) channel delay spread, or both. Improving communication reliability may reduce a number of retransmissions used to communicate information by the wireless device, effectively reducing a number of times the processor ramps up processing power and turns on processing units to handle communications. Furthermore, reducing the number of retransmissions may reduce channel overhead.

Figure 7:
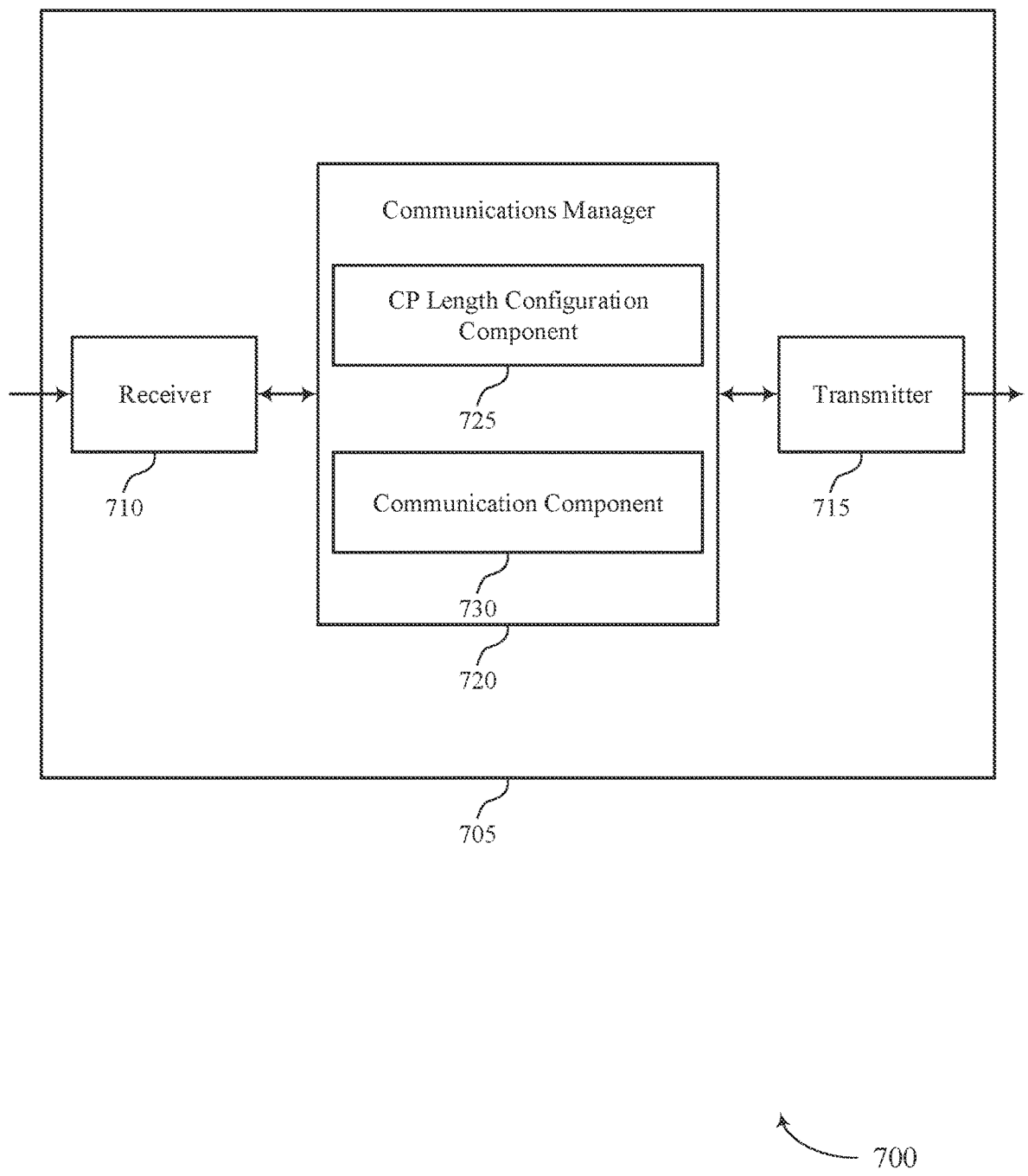

FIG. 7 shows a block diagram 700 of a device 705 that supports configurable CP lengths for single carrier waveforms in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to configurable CP lengths for single carrier waveforms). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to configurable CP lengths for single carrier waveforms). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of configurable CP lengths for single carrier waveforms as described herein. For example, the communications manager 720 may include a CP length configuration component 725 a communication component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The CP length configuration component 725 may be configured as or otherwise support a means for receiving, from a base station, a configuration message indicating a UE-specific CP length for communicating with the base station. The communication component 730 may be configured as or otherwise support a means for communicating with the base station through transmittal or receipt of a signal in one or more symbols using a single carrier waveform and a CP based on the UE-specific CP length, the one or more symbols being aligned in a time domain with one or more corresponding symbols of a reference OFDM waveform.

Figure 8:
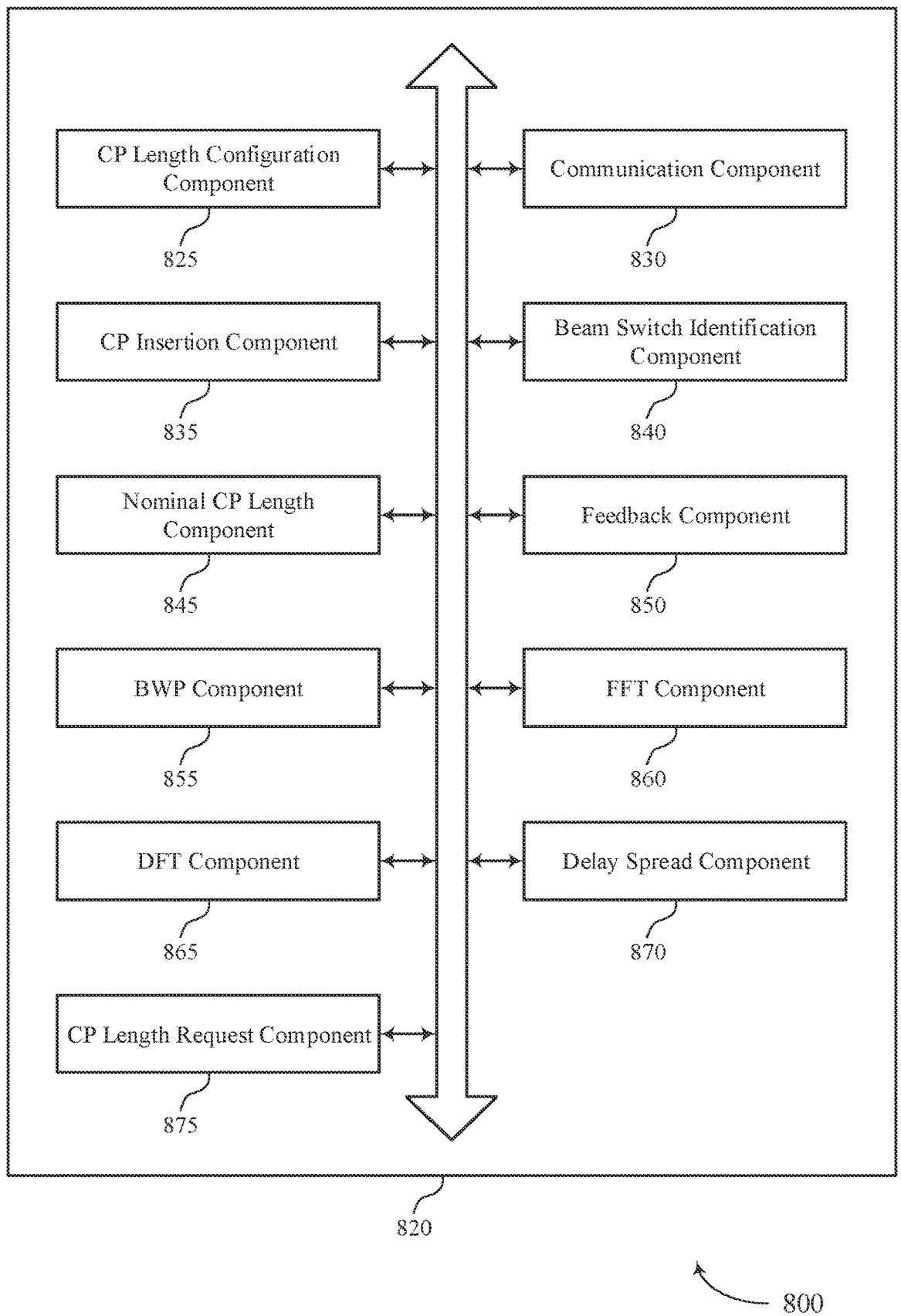
FIG. 8 shows a block diagram of a communications manager that supports configurable CP lengths for single carrier waveforms in accordance with aspects of the present disclosure.

FIG. 8 shows a block diagram 800 of a communications manager 820 that supports configurable CP lengths for single carrier waveforms in accordance with aspects of the present disclosure. The communications manager 820 may be an example of aspects of a communications manager 620, a communications manager 720, or both, as described herein. The communications manager 820, or various components thereof, may be an example of means for performing various aspects of configurable CP lengths for single carrier waveforms as described herein. For example, the communications manager 820 may include a CP length configuration component 825, a communication component 830, a CP insertion component 835, a beam switch identification component 840, a nominal CP length component 845, a feedback component 850, a BWP component 855, an FFT component 860, a DFT component 865, a delay spread component 870, a CP length request component 875, or any combination thereof. Each of these components may communicate, directly or indirectly, with one another (e.g., via one or more buses).

The communications manager 820 may support wireless communications at a UE in accordance with examples as disclosed herein. The CP length configuration component 825 may be configured as or otherwise support a means for receiving a configuration message indicating a UE-specific CP length for communicating with a base station. The communication component 830 may be configured as or otherwise support a means for communicating with the base station using a single carrier waveform and a CP based on the UE-specific CP length, where the communicating includes transmitting or receiving a signal in one or more symbols aligning in a time domain with one or more corresponding symbols of a reference OFDM waveform.

In some examples, to support communicating, the CP insertion component 835 may be configured as or otherwise support a means for inserting the CP into each symbol of the one or more symbols based on a channel delay spread. In some examples, to support communicating, the communication component 830 may be configured as or otherwise support a means for transmitting the signal after inserting the CP.

In some examples, to support communicating, the beam switch identification component 840 may be configured as or otherwise support a means for determining a symbol corresponding to a beam switching operation. In some examples, to support communicating, the CP insertion component 835 may be configured as or otherwise support a means for inserting the CP into the determined symbol based on a beam switching delay for the beam switching operation. In some examples, to support communicating, the communication component 830 may be configured as or otherwise support a means for transmitting the signal after inserting the CP. In some examples, the beam switch identification component 840 may be configured as or otherwise support a means for determining the beam switching delay is greater than a nominal CP length associated with a numerology of a RAT for the UE, where the symbol corresponding to the beam switching operation is determined and the CP is inserted based on the beam switching delay being greater than the nominal CP length.

In some examples, the nominal CP length component 845 may be configured as or otherwise support a means for determining a nominal CP length based on a numerology of a RAT. In some examples, the nominal CP length component 845 may be configured as or otherwise support a means for refraining from using the nominal CP length for the CP based on receiving the configuration message indicating the UE-specific CP length.

In some examples, to support communicating, the communication component 830 may be configured as or otherwise support a means for receiving the signal. In some examples, to support communicating, the FFT component 860 may be configured as or otherwise support a means for performing an FFT on the signal using an FFT size that is the same for the UE-specific CP length and the nominal CP length.

In some examples, the CP includes a set of multiple zero samples. In some examples, the UE-specific CP length is greater than a nominal CP length associated with a numerology of a RAT for the UE.

In some examples, the UE-specific CP length is less than a nominal CP length associated with a numerology of a RAT for the UE and is based on a DFT size. In some examples, to support communicating, the communication component 830 may be configured as or otherwise support a means for receiving the signal. In some examples, to support communicating, the DFT component 865 may be configured as or otherwise support a means for performing a DFT on the signal using the DFT size and based on the UE-specific CP length.

In some examples, the feedback component 850 may be configured as or otherwise support a means for transmitting a feedback message to the base station, where the UE-specific CP length is based on the feedback message.

In some examples, the delay spread component 870 may be configured as or otherwise support a means for measuring a channel delay spread between the base station and the UE, where the feedback message indicates the measured channel delay spread and the UE-specific CP length is based on the measured channel delay spread.

In some examples, the delay spread component 870 may be configured as or otherwise support a means for determining a channel delay spread index from a lookup table based on the measured channel delay spread, where the feedback message includes the channel delay spread index.

In some examples, the UE-specific CP length includes a first CP length, and the CP length request component 875 may be configured as or otherwise support a means for determining a second CP length from a set of configured CP lengths, where the feedback message includes a request for the second CP length and the first CP length is based on the second CP length.

In some examples, the feedback message includes a CSI feedback message.

In some examples, the configuration message further indicates a BWP configuration including at least one or more associations between one or more BWPs and one or more CP lengths, and the BWP component 855 may be configured as or otherwise support a means for determining a BWP of the one or more BWPs for communication. In some examples, the configuration message further indicates a BWP configuration including at least one or more associations between one or more BWPs and one or more CP lengths, and the BWP component 855 may be configured as or otherwise support a means for determining the UE-specific CP length based on an association of the one or more associations between the determined BWP and the UE-specific CP length.

In some examples, the configuration message indicates an active period for the UE-specific CP length, and the communication component 830 may be configured as or otherwise support a means for communicating using the UE-specific CP length during the active period.

In some examples, the communication component 830 may be configured as or otherwise support a means for determining an expiration of the active period. In some examples, the communication component 830 may be configured as or otherwise support a means for communicating using a nominal CP length associated with a numerology of a RAT for the UE based on the expiration of the active period.

In some examples, the configuration message includes an index value corresponding to the UE-specific CP length of a set of configured CP lengths. In some other examples, the configuration message includes an absolute length value for the UE-specific CP length.

In some examples, the UE-specific CP length is based on a channel delay spread, an operating CINR, a beam switching gap threshold, a phase noise mitigation threshold, or a combination thereof.

In some examples, the configuration message includes a DCI message, a MAC-CE, an RRC message, or a combination thereof.

Figure 9:
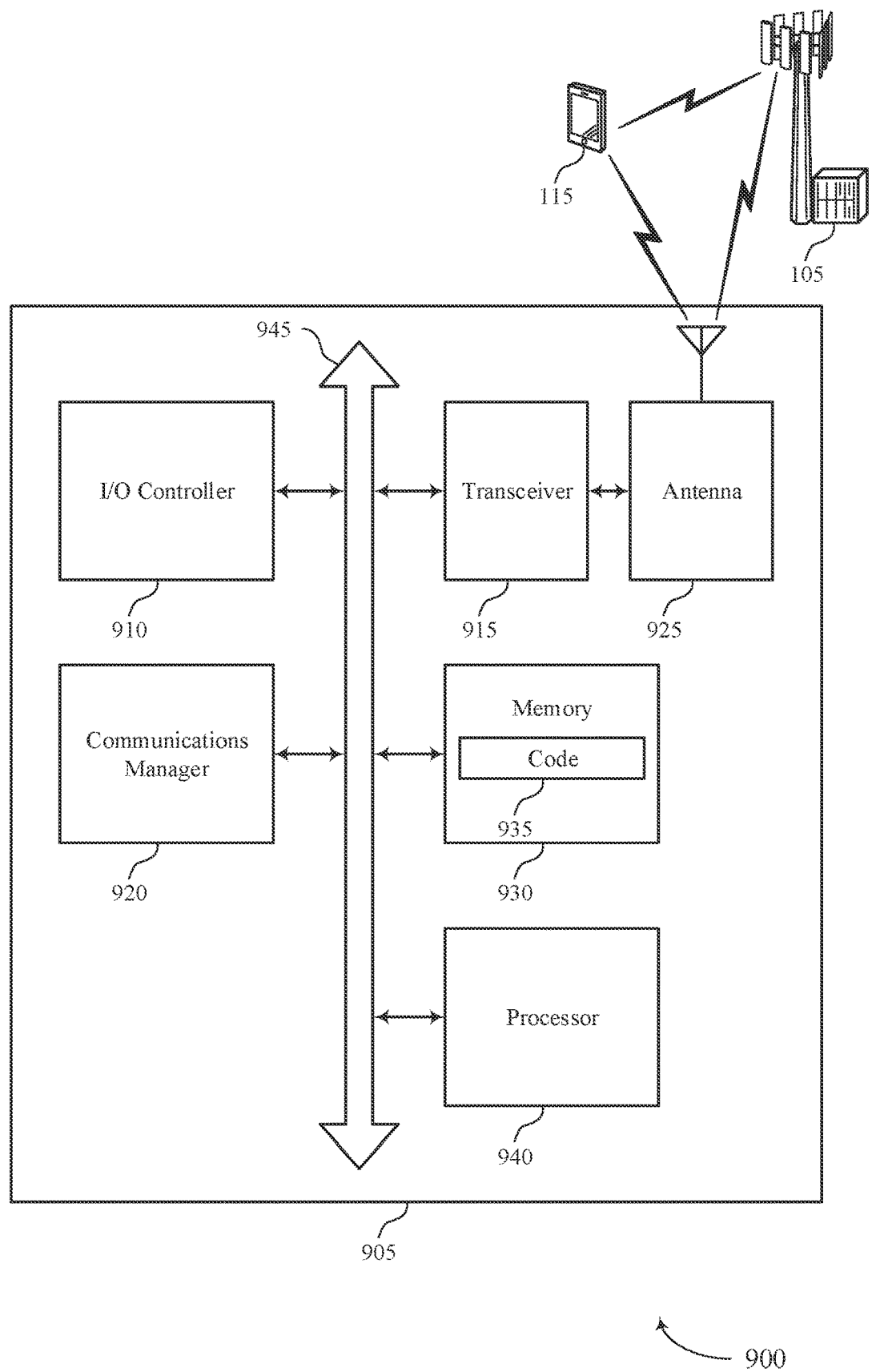
FIG. 9 shows a diagram of a system including a device that supports configurable CP lengths for single carrier waveforms in accordance with aspects of the present disclosure.

FIG. 9 shows a diagram of a system 900 including a device 905 that supports configurable CP lengths for single carrier waveforms in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting configurable CP lengths for single carrier waveforms). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a configuration message indicating a UE-specific CP length for communicating with a base station. The communications manager 920 may be configured as or otherwise support a means for communicating with the base station using a single carrier waveform and a CP based on the UE-specific CP length, where the communicating includes transmitting or receiving a signal in one or more symbols aligning in a time domain with one or more corresponding symbols of a reference OFDM waveform.

By including or configuring the communications manager 920 in accordance with examples as described herein, the device 905 may support techniques for improving communication reliability and more effectively utilizing available communication resources. For example, the device 905 may use a configured CP length to account for a beam switching delay, supporting effective use of the beam switching symbol for control and/or data communications. Additionally or alternatively, the device 905 may use a configured CP length to mitigate the negative effects of a channel delay spread, improving FFT operations and, accordingly, communication reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of configurable CP lengths for single carrier waveforms as described herein, or the processor 940 and the memory 930 may be otherwise configured to perform or support such operations.

Figure 10:
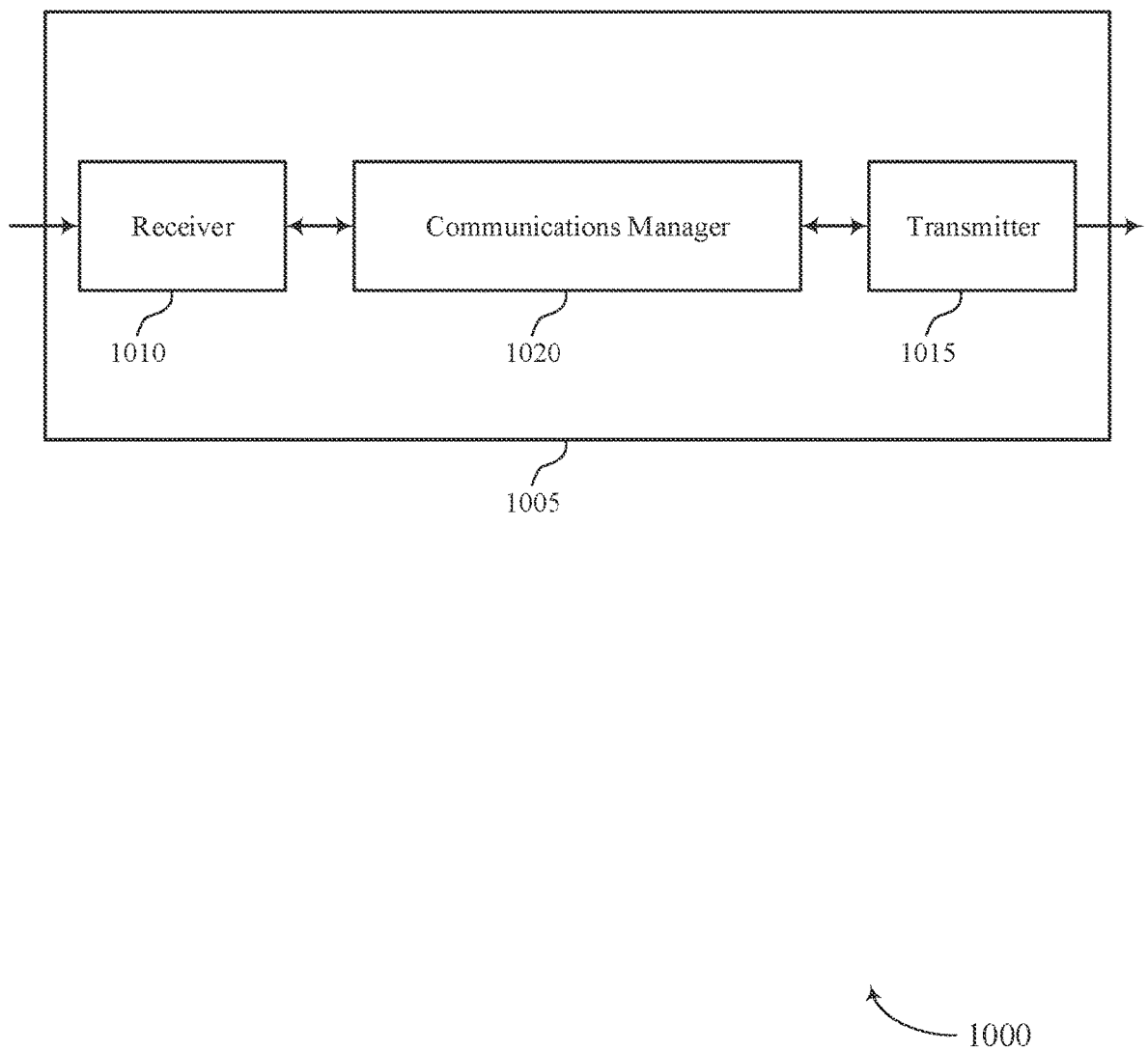
FIGS. 10 and 11 show block diagrams of devices that support configurable CP lengths for single carrier waveforms in accordance with aspects of the present disclosure.

FIG. 10 shows a block diagram 1000 of a device 1005 that supports configurable CP lengths for single carrier waveforms in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to configurable CP lengths for single carrier waveforms). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to configurable CP lengths for single carrier waveforms). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of configurable CP lengths for single carrier waveforms as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, a configuration message including a UE-specific CP length. The communications manager 1020 may be configured as or otherwise support a means for communicating with the UE using a single carrier waveform and a CP based on the UE-specific CP length, where the communicating involves transmitting or receiving a signal in one or more symbols aligning in a time domain with one or more corresponding symbols of a reference OFDM waveform.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for coordinating between different wireless devices using different waveform types in a same frequency band. For example, wireless devices may use single carrier waveforms with configurable CP lengths, OFDM waveforms, or both in the frequency band while maintaining symbol-level alignment for improved scheduling and interference mitigation.

Figure 11:
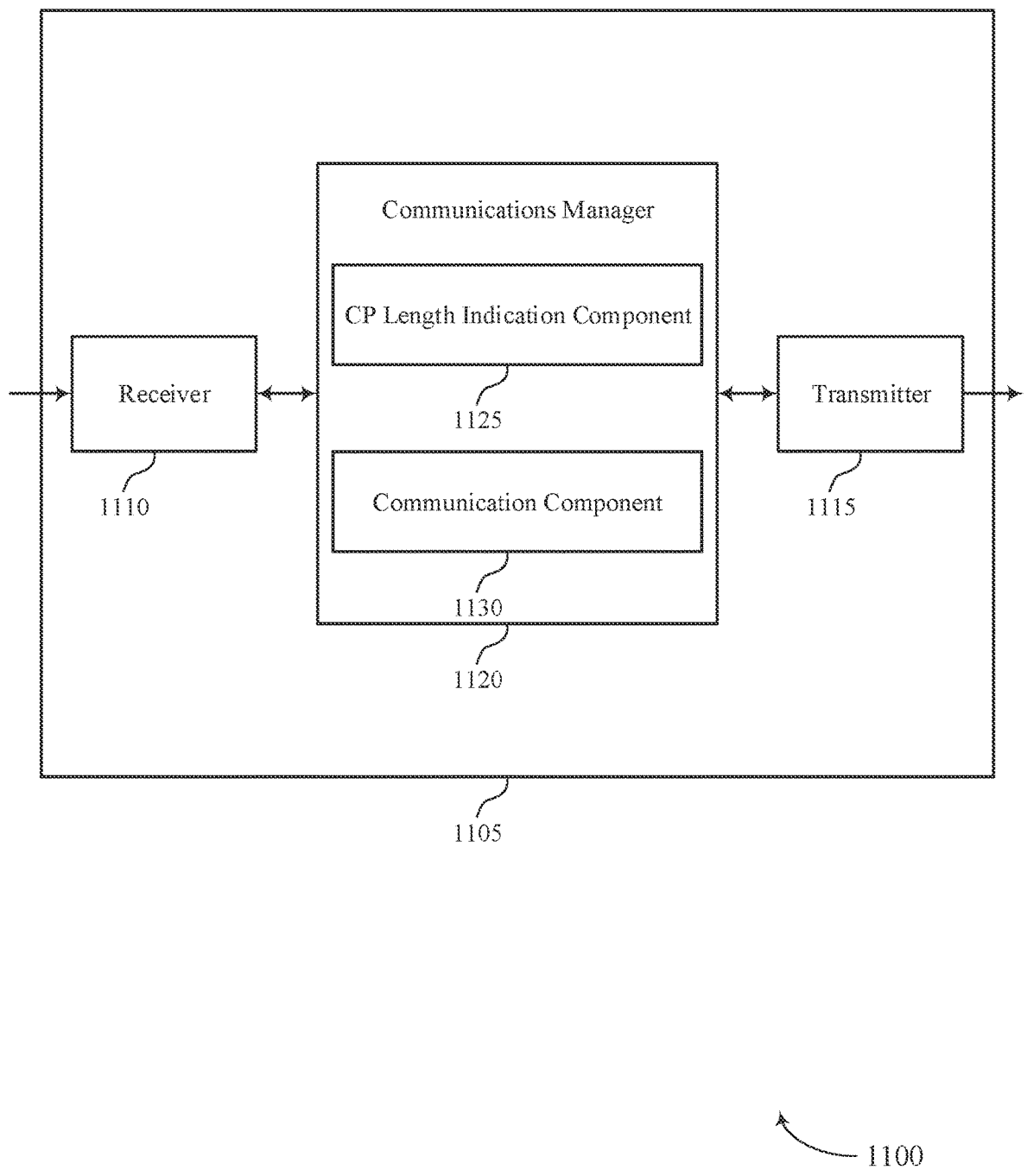

FIG. 11 shows a block diagram 1100 of a device 1105 that supports configurable CP lengths for single carrier waveforms in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to configurable CP lengths for single carrier waveforms). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to configurable CP lengths for single carrier waveforms). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of configurable CP lengths for single carrier waveforms as described herein. For example, the communications manager 1120 may include a CP length indication component 1125 a communication component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The CP length indication component 1125 may be configured as or otherwise support a means for transmitting, to a UE, a configuration message including a UE-specific CP length. The communication component 1130 may be configured as or otherwise support a means for communicating with the UE through transmittal or receipt of a signal in one or more symbols using a single carrier waveform and a CP based on the UE-specific CP length, the one or more symbols aligning in a time domain with one or more corresponding symbols of a reference OFDM waveform.

Figure 12:
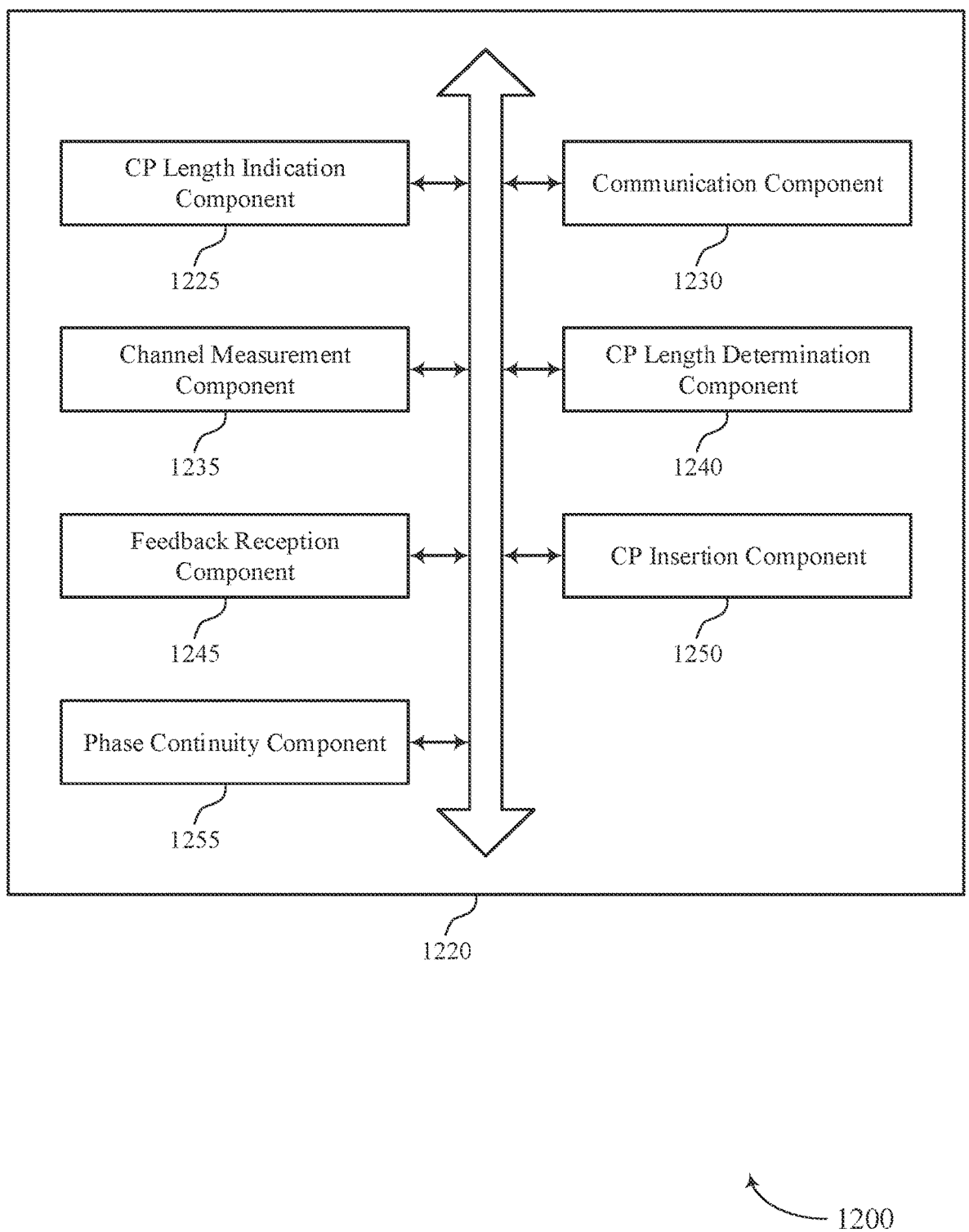
FIG. 12 shows a block diagram of a communications manager that supports configurable CP lengths for single carrier waveforms in accordance with aspects of the present disclosure.

FIG. 12 shows a block diagram 1200 of a communications manager 1220 that supports configurable CP lengths for single carrier waveforms in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of configurable CP lengths for single carrier waveforms as described herein. For example, the communications manager 1220 may include a CP length indication component 1225, a communication component 1230, a channel measurement component 1235, a CP length determination component 1240, a feedback reception component 1245, a CP insertion component 1250, a phase continuity component 1255, or any combination thereof. Each of these components may communicate, directly or indirectly, with one another (e.g., via one or more buses).

The communications manager 1220 may support wireless communications at a base station in accordance with examples as disclosed herein. The CP length indication component 1225 may be configured as or otherwise support a means for transmitting, to a UE, a configuration message including a UE-specific CP length. The communication component 1230 may be configured as or otherwise support a means for communicating with the UE using a single carrier waveform and a CP based on the UE-specific CP length, where the communicating includes transmitting or receiving a signal in one or more symbols aligning in a time domain with one or more corresponding symbols of a reference OFDM waveform.

In some examples, the channel measurement component 1235 may be configured as or otherwise support a means for performing one or more channel measurements for one or more uplink signals. In some examples, the CP length determination component 1240 may be configured as or otherwise support a means for determining the UE-specific CP length based on the one or more channel measurements.

In some examples, the feedback reception component 1245 may be configured as or otherwise support a means for receiving a feedback message from the UE. In some examples, the CP length determination component 1240 may be configured as or otherwise support a means for determining the UE-specific CP length based on the feedback message.

In some examples, the CP length determination component 1240 may be configured as or otherwise support a means for determining the UE-specific CP length based on a channel delay spread, an operating CINR, a beam switching gap threshold, a phase noise mitigation threshold, or a combination thereof.

In some examples, the CP includes a set of multiple zero samples and the CP insertion component 1250 may be configured as or otherwise support a means for inserting the CP into the one or more symbols. In some examples, the phase continuity component 1255 may be configured as or otherwise support a means for maintaining phase continuity in connection with inserting the CP. In some examples, the communication component 1230 may be configured as or otherwise support a means for transmitting the signal based on inserting the CP and maintaining the phase continuity.

Figure 13:
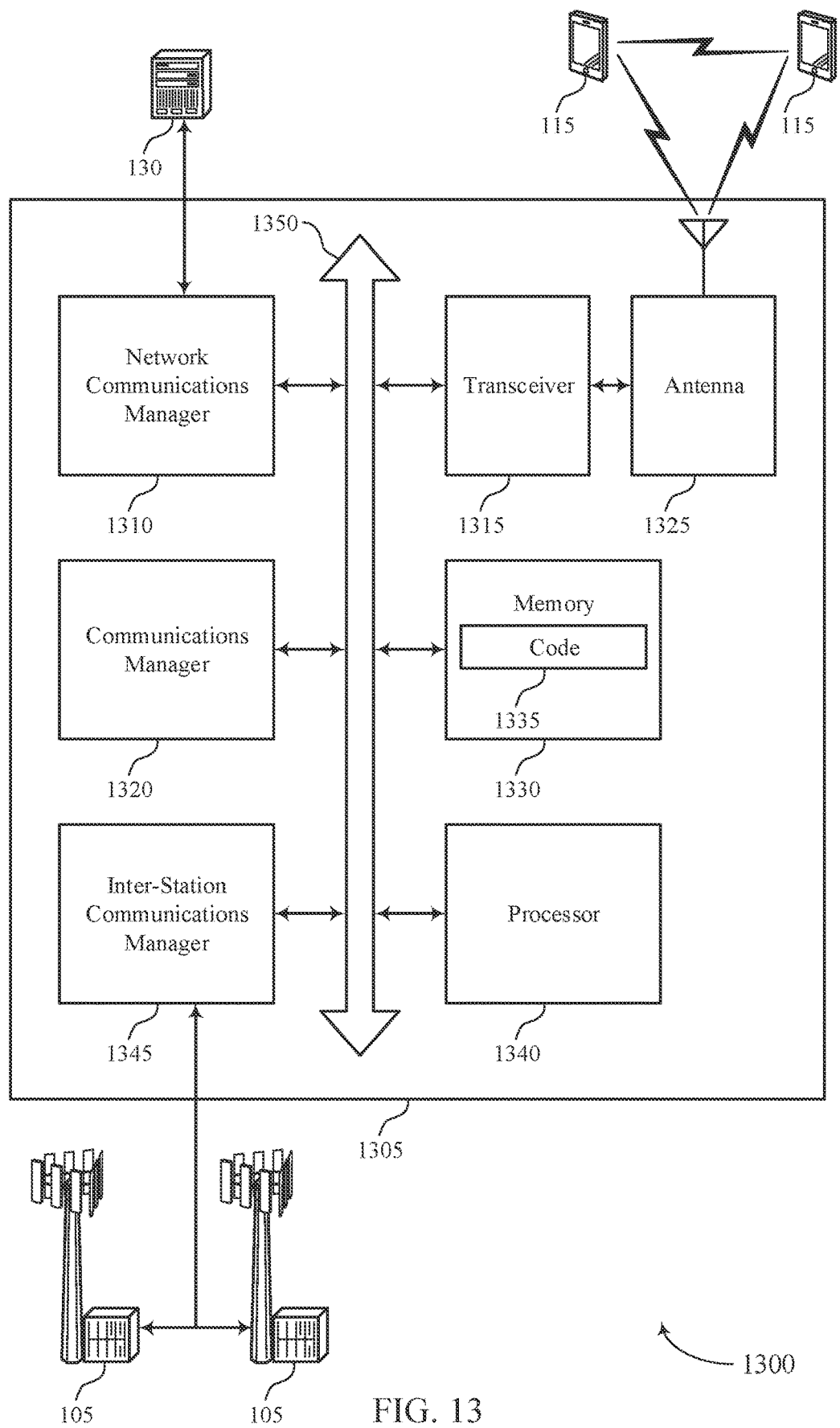
FIG. 13 shows a diagram of a system including a device that supports configurable CP lengths for single carrier waveforms in accordance with aspects of the present disclosure.

FIG. 13 shows a diagram of a system 1300 including a device 1305 that supports configurable CP lengths for single carrier waveforms in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting configurable CP lengths for single carrier waveforms). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, a configuration message including a UE-specific CP length. The communications manager 1320 may be configured as or otherwise support a means for communicating with the UE using a single carrier waveform and a CP based on the UE-specific CP length, where the communicating includes transmitting or receiving a signal in one or more symbols aligning in a time domain with one or more corresponding symbols of a reference OFDM waveform.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of configurable CP lengths for single carrier waveforms as described herein, or the processor 1340 and the memory 1330 may be otherwise configured to perform or support such operations.

Figure 14:
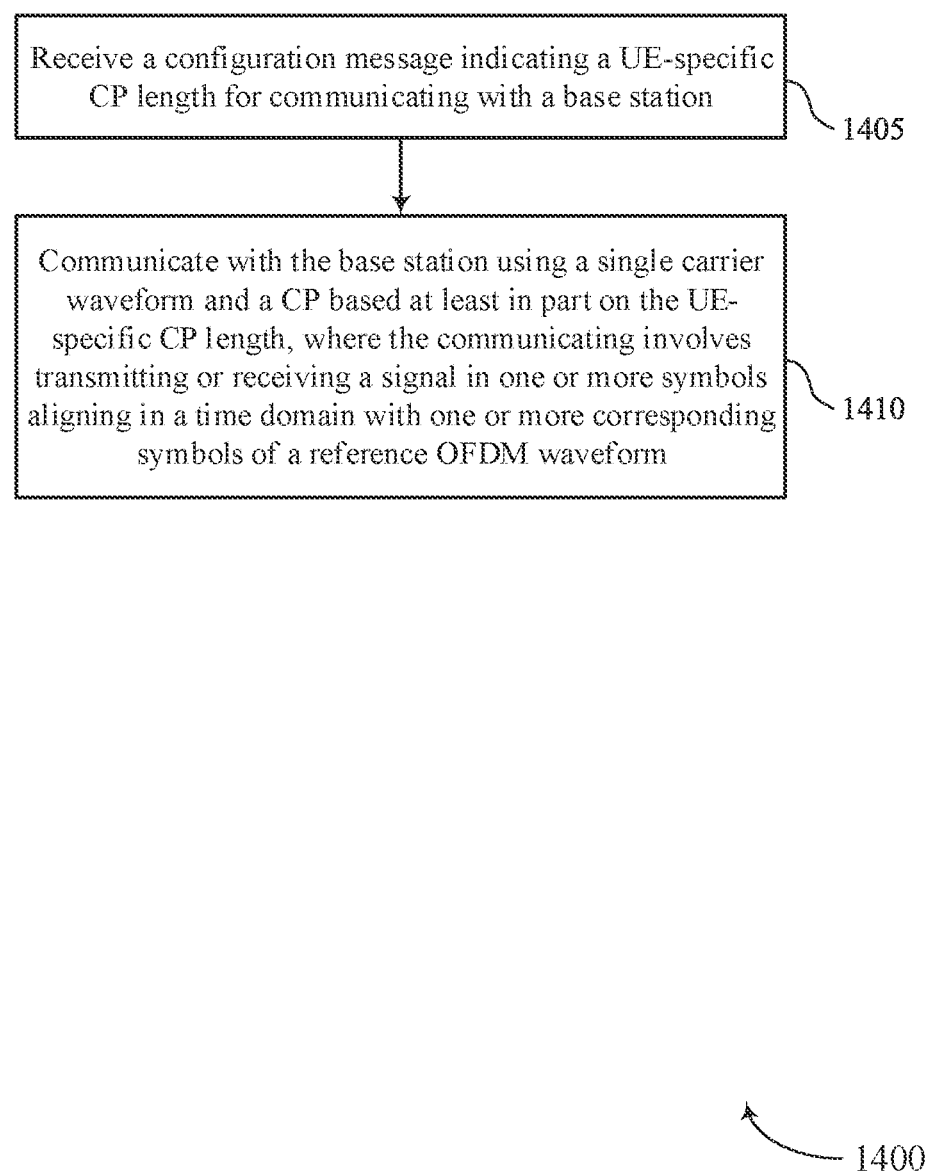
FIGS. 14 through 17 show flowcharts illustrating methods that support configurable CP lengths for single carrier waveforms in accordance with aspects of the present disclosure.

FIG. 14 shows a flowchart illustrating a method 1400 that supports configurable CP lengths for single carrier waveforms in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a configuration message indicating a UE-specific CP length for communicating with a base station. The operations of 1405 may be performed in accordance with examples as disclosed herein. In some examples, aspects of the operations of 1405 may be performed by a CP length configuration component 825 as described with reference to FIG. 8.

At 1410, the method may include communicating with the base station using a single carrier waveform and a CP based on the UE-specific CP length, where the communicating involves transmitting or receiving a signal in one or more symbols aligning in a time domain with one or more corresponding symbols of a reference OFDM waveform. The operations of 1410 may be performed in accordance with examples as disclosed herein. In some examples, aspects of the operations of 1410 may be performed by a communication component 830 as described with reference to FIG. 8.

Figure 15:
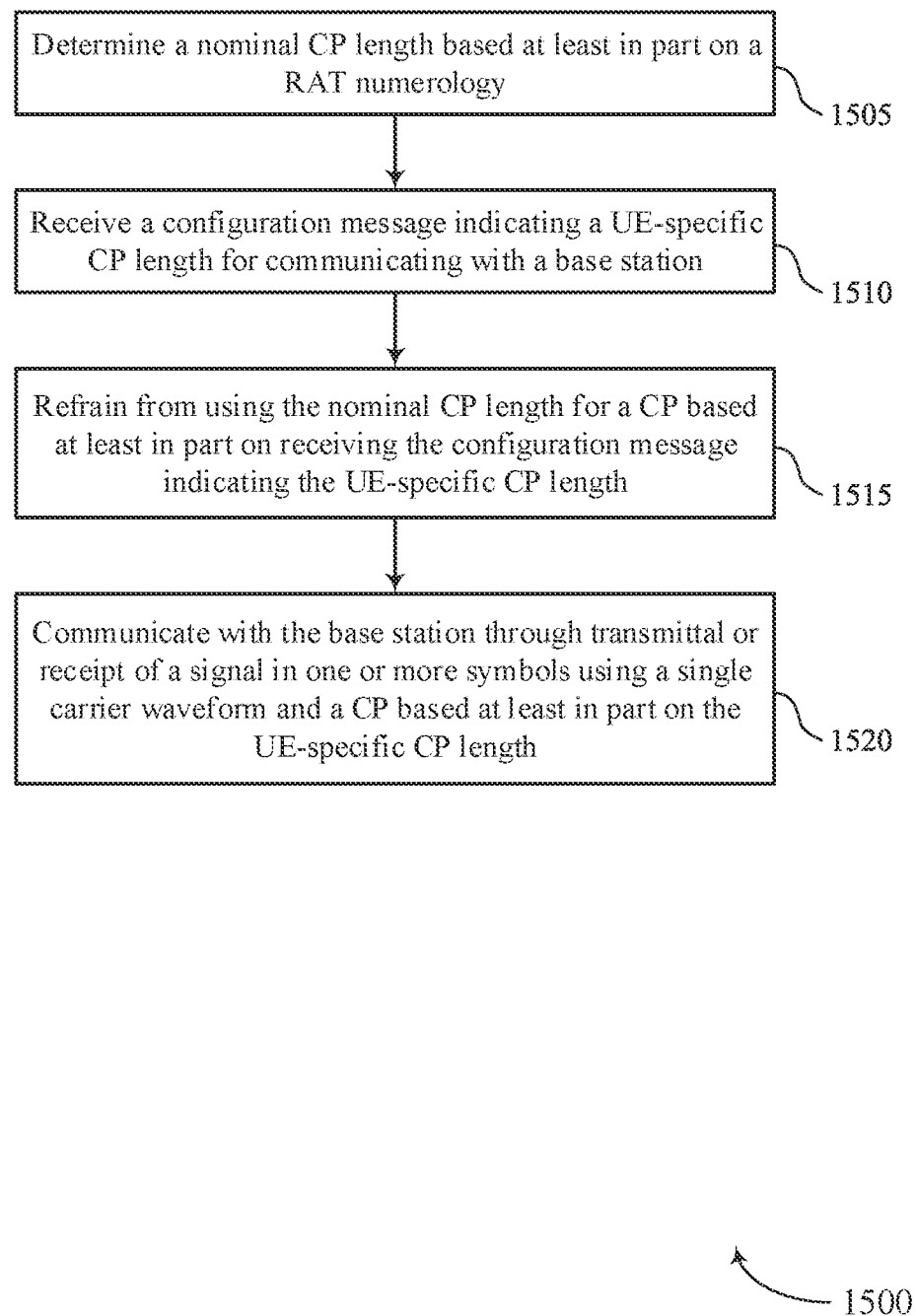

FIG. 15 shows a flowchart illustrating a method 1500 that supports configurable CP lengths for single carrier waveforms in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include determining a nominal CP length based on a RAT numerology. The operations of 1505 may be performed in accordance with examples as disclosed herein. In some examples, aspects of the operations of 1505 may be performed by a nominal CP length component 845 as described with reference to FIG. 8.

At 1510, the method may include receiving, from a base station, a configuration message indicating a UE-specific CP length. The operations of 1510 may be performed in accordance with examples as disclosed herein. In some examples, aspects of the operations of 1510 may be performed by a CP length configuration component 825 as described with reference to FIG. 8.

At 1515, the method may include refraining from using the nominal CP length for the CP based on receiving the configuration message indicating the UE-specific CP length. The operations of 1515 may be performed in accordance with examples as disclosed herein. In some examples, aspects of the operations of 1515 may be performed by a nominal CP length component 845 as described with reference to FIG. 8.

At 1520, the method may include communicating with the base station using a single carrier waveform and a CP based on the UE-specific CP length. The communicating may involve transmitting or receiving a signal in one or more symbols which may align in a time domain with one or more corresponding symbols of a reference OFDM waveform. The operations of 1520 may be performed in accordance with examples as disclosed herein. In some examples, aspects of the operations of 1520 may be performed by a communication component 830 as described with reference to FIG. 8.

Figure 16:
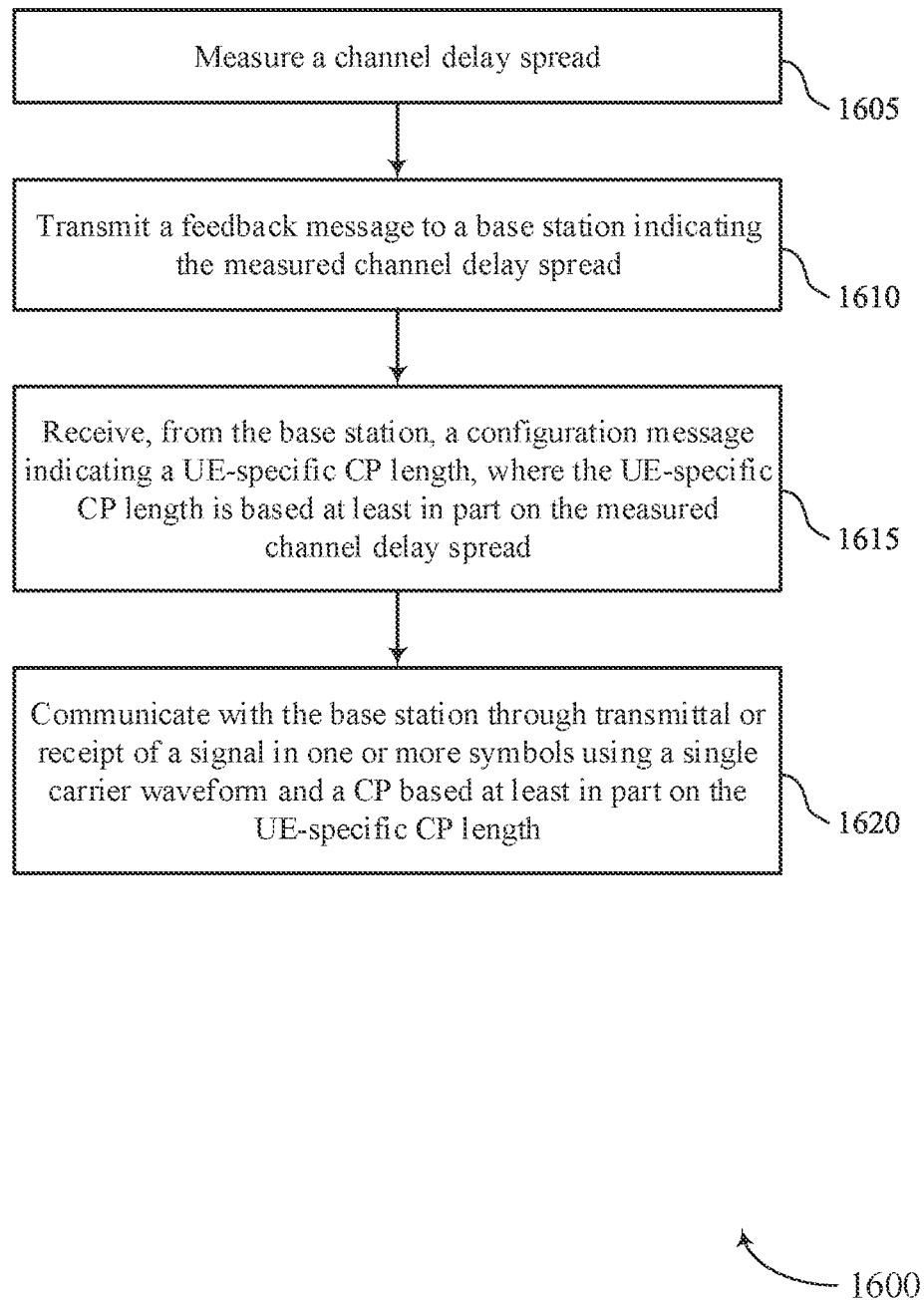

FIG. 16 shows a flowchart illustrating a method 1600 that supports configurable CP lengths for single carrier waveforms in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include measuring a channel delay spread between a base station and the UE. The operations of 1605 may be performed in accordance with examples as disclosed herein. In some examples, aspects of the operations of 1605 may be performed by a delay spread component 870 as described with reference to FIG. 8.

At 1610, the method may include transmitting a feedback message to the base station indicating the measured channel delay spread. The operations of 1610 may be performed in accordance with examples as disclosed herein. In some examples, aspects of the operations of 1610 may be performed by a feedback component 850 as described with reference to FIG. 8.

At 1615, the method may include receiving, from the base station, a configuration message indicating a UE-specific CP length, where the UE-specific CP length is based on the measured channel delay spread indicated by the feedback message. The operations of 1615 may be performed in accordance with examples as disclosed herein. In some examples, aspects of the operations of 1615 may be performed by a CP length configuration component 825 as described with reference to FIG. 8.

At 1620, the method may include communicating with the base station using a single carrier waveform and a CP based on the UE-specific CP length. The communicating may involve transmitting or receiving a signal in one or more symbols which may align in a time domain with one or more corresponding symbols of a reference OFDM waveform. The operations of 1620 may be performed in accordance with examples as disclosed herein. In some examples, aspects of the operations of 1620 may be performed by a communication component 830 as described with reference to FIG. 8.

Figure 17:
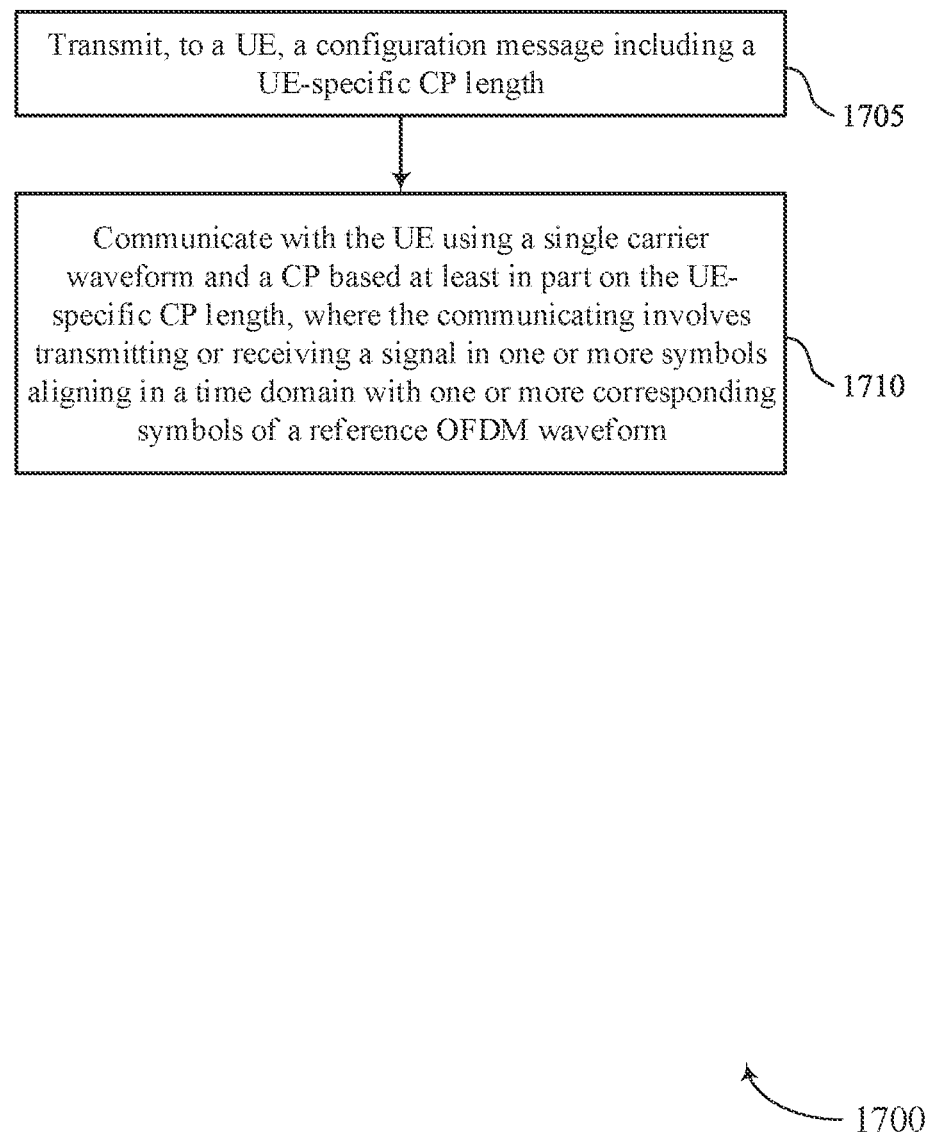

FIG. 17 shows a flowchart illustrating a method 1700 that supports configurable CP lengths for single carrier waveforms in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a configuration message including a UE-specific CP length. The operations of 1705 may be performed in accordance with examples as disclosed herein. In some examples, aspects of the operations of 1705 may be performed by a CP length indication component 1225 as described with reference to FIG. 12.

At 1710, the method may include communicating with the UE using a single carrier waveform and a CP based on the UE-specific CP length, where the communicating may involve transmitting or receiving a signal in one or more symbols aligning in a time domain with one or more corresponding symbols of a reference OFDM waveform. The operations of 1710 may be performed in accordance with examples as disclosed herein. In some examples, aspects of the operations of 1710 may be performed by a communication component 1230 as described with reference to FIG. 12.

The following provides an overview of aspects of the present disclosure:

Aspect 1: A method for wireless communications at a UE, comprising: receiving a configuration message indicating a UE-specific CP length for communicating with a base station; and communicating with the base station using a single carrier waveform and a CP based at least in part on the UE-specific CP length, wherein the communicating comprises transmitting or receiving a signal in one or more symbols aligning in a time domain with one or more corresponding symbols of a reference OFDM waveform.

Aspect 2: The method of aspect 1, wherein the communicating comprises: inserting the CP into each symbol of the one or more symbols based at least in part on a channel delay spread; and transmitting the signal after the inserting the CP.

Aspect 3: The method of aspect 1, wherein the communicating comprises: determining a symbol corresponding to a beam switching operation; inserting the CP into the determined symbol based at least in part on a beam switching delay for the beam switching operation; and transmitting the signal after the inserting the CP.

Aspect 4: The method of aspect 3, further comprising: determining the beam switching delay is greater than a nominal cyclic prefix length associated with a numerology of a radio access technology for the UE, wherein the symbol corresponding to the beam switching operation is determined and the cyclic prefix is inserted based at least in part on the beam switching delay being greater than the nominal cyclic prefix length.

Aspect 5: The method of any of aspects 1 through 4, further comprising: determining a nominal CP length based at least in part on a numerology of a RAT; and refraining from using the nominal CP length for the CP based at least in part on receiving the configuration message indicating the UE-specific CP length.

Aspect 6: The method of aspect 5, wherein the communicating comprises: receiving the signal; and performing an FFT on the signal using an FFT size that is the same for the UE-specific CP length and the nominal CP length.

Aspect 7: The method of any of aspects 1 through 6, wherein the CP comprises a plurality of zero samples.

Aspect 8: The method of any of aspects 1 through 7, wherein the UE-specific CP length is greater than a nominal CP length associated with a numerology of a RAT for the UE.

Aspect 9: The method of any of aspects 1 through 7, wherein the UE-specific CP length is less than a nominal CP length associated with a numerology of a RAT for the UE and is based at least in part on a DFT size.

Aspect 10: The method of aspect 9, wherein the communicating comprises: receiving the signal; and performing a DFT on the signal using the DFT size and based at least in part on the UE-specific CP length.

Aspect 11: The method of any of aspects 1 through 10, further comprising: transmitting a feedback message to the base station, wherein the UE-specific CP length is based at least in part on the feedback message.

Aspect 12: The method of aspect 11, further comprising: measuring a channel delay spread between the base station and the UE, wherein the feedback message indicates the measured channel delay spread and the UE-specific CP length is based at least in part on the measured channel delay spread.

Aspect 13: The method of aspect 12, further comprising: determining a channel delay spread index from a lookup table based at least in part on the measured channel delay spread, wherein the feedback message comprises the channel delay spread index.

Aspect 14: The method of any of aspects 11 through 12, wherein the UE-specific CP length comprises a first CP length, the method further comprising: determining a second CP length from a set of configured CP lengths, wherein the feedback message comprises a request for the second CP length and the first CP length is based at least in part on the second CP length.

Aspect 15: The method of any of aspects 11 through 14, wherein the feedback message comprises a CSI feedback message.

Aspect 16: The method of any of aspects 1 through 15, wherein the configuration message further indicates a BWP configuration comprising at least one or more associations between one or more BWPs and one or more CP lengths, the method further comprising: determining a BWP of the one or more BWPs for communication; and determining the UE-specific CP length based at least in part on an association of the one or more associations between the determined BWP and the UE-specific CP length.

Aspect 17: The method of any of aspects 1 through 16, wherein the configuration message indicates an active period for the UE-specific CP length, the method further comprising: communicating using the UE-specific CP length during the active period.

Aspect 18: The method of aspect 17, further comprising: determining an expiration of the active period; and communicating using a nominal CP length associated with a numerology of a RAT for the UE based at least in part on the expiration of the active period.

Aspect 19: The method of any of aspects 1 through 18, wherein the configuration message comprises an index value corresponding to the UE-specific CP length of a set of configured CP lengths.

Aspect 20: The method of any of aspects 1 through 18, wherein the configuration message comprises an absolute length value for the UE-specific CP length.

Aspect 21: The method of any of aspects 1 through 20, wherein the UE-specific CP length is based at least in part on a channel delay spread, an operating CINR, a beam switching gap threshold, a phase noise mitigation threshold, or a combination thereof.

Aspect 22: The method of any of aspects 1 through 21, wherein the configuration message comprises a DCI message, a MAC-CE, an RRC message, or a combination thereof.

Aspect 23: A method for wireless communications at a base station, comprising: transmitting, to a UE, a configuration message comprising a UE-specific CP length; and communicating with the UE using a single carrier waveform and a CP based at least in part on the UE-specific CP length, wherein the communicating comprises transmitting or receiving a signal in one or more symbols aligning in a time domain with one or more corresponding symbols of a reference OFDM waveform.

Aspect 24: The method of aspect 23, further comprising: performing one or more channel measurements for one or more uplink signals; and determining the UE-specific CP length based at least in part on the one or more channel measurements.

Aspect 25: The method of any of aspects 23 through 24, further comprising: receiving a feedback message from the UE; and determining the UE-specific CP length based at least in part on the feedback message.

Aspect 26: The method of any of aspects 23 through 25, further comprising: determining the UE-specific CP length based at least in part on a channel delay spread, an operating CINR, a beam switching gap threshold, a phase noise mitigation threshold, or a combination thereof.

Aspect 27: The method of any of aspects 23 through 26, wherein the CP comprises a plurality of zero samples and the communicating comprises: inserting the CP into the one or more symbols; maintaining phase continuity in connection with inserting the CP; and transmitting the signal based at least in part on inserting the CP and maintaining the phase continuity.

Aspect 28: An apparatus for wireless communications, comprising a processor; memory coupled with the processor; and instructions stored in the memory and executable by the processor to cause the apparatus to perform a method of any of aspects 1 through 22.

Aspect 29: An apparatus for wireless communications, comprising at least one means for performing a method of any of aspects 1 through 22.

Aspect 30: A non-transitory computer-readable medium storing code for wireless communications at a UE, the code comprising instructions executable by a processor to perform a method of any of aspects 1 through 22.

Aspect 31: An apparatus for wireless communications, comprising a processor; memory coupled with the processor; and instructions stored in the memory and executable by the processor to cause the apparatus to perform a method of any of aspects 23 through 27.

Aspect 32: An apparatus for wireless communications, comprising at least one means for performing a method of any of aspects 23 through 27.

Aspect 33: A non-transitory computer-readable medium storing code for wireless communications at a base station, the code comprising instructions executable by a processor to perform a method of any of aspects 23 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a configuration message indicating a UE-specific cyclic prefix length for communicating with a network device, wherein the UE-specific cyclic prefix length is different from a nominal cyclic prefix length associated with a numerology of a radio access technology for the UE; and
   communicating with the network device using a single carrier waveform and a cyclic prefix based at least in part on the UE-specific cyclic prefix length, wherein the communicating comprises transmitting or receiving a signal in one or more symbols of the single carrier waveform aligning in a time domain with one or more corresponding symbols of a reference orthogonal frequency division multiplexing waveform.

2. The method of claim 1, wherein the communicating comprises:
   inserting the cyclic prefix into each symbol of the one or more symbols based at least in part on a channel delay spread; and
   transmitting the signal after the inserting the cyclic prefix.

3. The method of claim 1, wherein the communicating comprises:
   determining a symbol corresponding to a beam switching operation;
   inserting the cyclic prefix into the determined symbol based at least in part on a beam switching delay for the beam switching operation; and
   transmitting the signal after the inserting the cyclic prefix.

4. The method of claim 3, further comprising:
   determining the beam switching delay is greater than the nominal cyclic prefix length, wherein the symbol corresponding to the beam switching operation is determined and the cyclic prefix is inserted based at least in part on the beam switching delay being greater than the nominal cyclic prefix length.

5. The method of claim 1, further comprising:
   refraining from using the nominal cyclic prefix length for the cyclic prefix based at least in part on receiving the configuration message indicating the UE-specific cyclic prefix length.

6. The method of claim 5, wherein the communicating comprises:
   receiving the signal; and
   performing a fast Fourier transform on the signal using a fast Fourier transform size that is the same for the UE-specific cyclic prefix length and the nominal cyclic prefix length.

7. The method of claim 1, wherein the cyclic prefix comprises a plurality of zero samples.

8. The method of claim 7, wherein the UE-specific cyclic prefix length is greater than the nominal cyclic prefix length.

9. The method of claim 1, wherein the UE-specific cyclic prefix length is less than the nominal cyclic prefix length and is based at least in part on a discrete Fourier transform size.

10. The method of claim 9, wherein the communicating comprises:
    receiving the signal; and
    performing a discrete Fourier transform on the signal using the discrete Fourier transform size and based at least in part on the UE-specific cyclic prefix length.

11. The method of claim 1, further comprising:
    transmitting a feedback message to the network device, wherein the UE-specific cyclic prefix length is based at least in part on the feedback message.

12. The method of claim 11, further comprising:
    measuring a channel delay spread between the network device and the UE, wherein the feedback message indicates the measured channel delay spread and the UE-specific cyclic prefix length is based at least in part on the measured channel delay spread.

13. The method of claim 12, further comprising:
    determining a channel delay spread index from a lookup table based at least in part on the measured channel delay spread, wherein the feedback message comprises the channel delay spread index.

14. The method of claim 11, wherein the UE-specific cyclic prefix length comprises a first cyclic prefix length, the method further comprising:
    determining a second cyclic prefix length from a set of configured cyclic prefix lengths, wherein the feedback message comprises a request for the second cyclic prefix length and the first cyclic prefix length is based at least in part on the second cyclic prefix length.

15. The method of claim 11, wherein the feedback message comprises a channel state information feedback message.

16. The method of claim 1, wherein the configuration message further indicates a bandwidth part configuration comprising at least one or more associations between one or more bandwidth parts and one or more cyclic prefix lengths, the method further comprising:
  determining a bandwidth part of the one or more bandwidth parts for communication; and
  determining the UE-specific cyclic prefix length based at least in part on an association of the one or more associations between the determined bandwidth part and the UE-specific cyclic prefix length.

17. The method of claim 1, wherein the configuration message indicates an active period for the UE-specific cyclic prefix length, the method further comprising:
  communicating using the UE-specific cyclic prefix length during the active period.

18. The method of claim 17, further comprising:
  determining an expiration of the active period; and
  communicating using the nominal cyclic prefix length based at least in part on the expiration of the active period.

19. The method of claim 1, wherein the configuration message comprises an index value corresponding to the UE-specific cyclic prefix length of a set of configured cyclic prefix lengths.

20. The method of claim 1, wherein the configuration message comprises an absolute length value for the UE-specific cyclic prefix length.

21. The method of claim 1, wherein the UE-specific cyclic prefix length is based at least in part on a channel delay spread, an operating carrier-to-interference plus noise ratio, a beam switching gap threshold, a phase noise mitigation threshold, or a combination thereof.

22. The method of claim 1, wherein the configuration message comprises a downlink control information message, a medium access control element, a radio resource control message, or a combination thereof.

23. A method for wireless communications at a network device, comprising:
  transmitting, to a user equipment (UE), a configuration message comprising a UE-specific cyclic prefix length, wherein the UE-specific cyclic prefix length is different from a nominal cyclic prefix length associated with a numerology of a radio access technology for the UE; and
  communicating with the UE using a single carrier waveform and a cyclic prefix based at least in part on the UE-specific cyclic prefix length, wherein the communicating comprises transmitting or receiving a signal in one or more symbols of the single carrier waveform aligning in a time domain with one or more corresponding symbols of a reference orthogonal frequency division multiplexing waveform.

24. The method of claim 23, further comprising:
  performing one or more channel measurements for one or more uplink signals; and
  determining the UE-specific cyclic prefix length based at least in part on the one or more channel measurements.

25. The method of claim 23, further comprising:
  receiving a feedback message from the UE; and
  determining the UE-specific cyclic prefix length based at least in part on the feedback message.

26. The method of claim 23, further comprising:
  determining the UE-specific cyclic prefix length based at least in part on a channel delay spread, an operating carrier-to-interference plus noise ratio, a beam switching gap threshold, a phase noise mitigation threshold, or a combination thereof.

27. The method of claim 23, wherein the cyclic prefix comprises a plurality of zero samples and the communicating comprises:
  inserting the cyclic prefix into the one or more symbols;
  maintaining phase continuity in connection with inserting the cyclic prefix; and
  transmitting the signal based at least in part on inserting the cyclic prefix and maintaining the phase continuity.

28. An apparatus for wireless communications, comprising:
  a processor;
  memory coupled with the processor; and
  instructions stored in the memory and executable by the processor to cause the apparatus to:
    receive a configuration message indicating a user equipment (UE)-specific cyclic prefix length for communicating with a network device, wherein the UE-specific cyclic prefix length is different from a nominal cyclic prefix length associated with a numerology of a radio access technology for the UE; and
    communicate with the network device using a single carrier waveform and a cyclic prefix based at least in part on the UE-specific cyclic prefix length, wherein the communicating comprises transmitting or receiving a signal in one or more symbols of the single carrier waveform aligning in a time domain with one or more corresponding symbols of a reference orthogonal frequency division multiplexing waveform.

29. The apparatus of claim 28, wherein the instructions to communicate are executable by the processor to cause the apparatus to:
  insert the cyclic prefix into each symbol of the one or more symbols based at least in part on a channel delay spread; and
  transmit the signal after the inserting the cyclic prefix.

30. An apparatus for wireless communications, comprising:
  a processor;
  memory coupled with the processor; and
  instructions stored in the memory and executable by the processor to cause the apparatus to:
    transmit, to a user equipment (UE), a configuration message comprising a UE-specific cyclic prefix length, wherein the UE-specific cyclic prefix length is different from a nominal cyclic prefix length associated with a numerology of a radio access technology for the UE; and
    communicate with the UE using a single carrier waveform and a cyclic prefix based at least in part on the UE-specific cyclic prefix length, wherein the communicating comprises transmitting or receiving a signal in one or more symbols of the single carrier waveform aligning in a time domain with one or more corresponding symbols of a reference orthogonal frequency division multiplexing waveform.

* * * * *